United States Patent [19]
Han

[11] Patent Number: 5,973,916
[45] Date of Patent: Oct. 26, 1999

[54] MONITOR-COUPLED PERSONAL COMPUTER AND METHOD OF ASSEMBLY

[75] Inventor: Jeong-Seon Han, Kyungki-do, Rep. of Korea

[73] Assignee: SamSung Electronics Co., Ltd., Kyungki-do, Rep. of Korea

[21] Appl. No.: 08/910,562

[22] Filed: Aug. 20, 1997

[30] Foreign Application Priority Data

Aug. 20, 1996 [KR] Rep. of Korea ...................... 96-25017
Aug. 20, 1996 [KR] Rep. of Korea ...................... 96-25018
Aug. 20, 1996 [KR] Rep. of Korea ...................... 96-34443

[51] Int. Cl.$^6$ ............................ G06F 1/16; G06F 1/00; H05K 5/00
[52] U.S. Cl. ........................... 361/682; 361/727; 348/836
[58] Field of Search ...................... 361/683, 682, 361/727; 312/223.2, 7.2; 348/836, 838, 839

[56] References Cited

U.S. PATENT DOCUMENTS

| | | |
|---|---|---|
| 4,387,951 | 6/1983 | Hall et al. ............................... 361/683 |
| 4,388,671 | 6/1983 | Hall et al. ............................... 361/682 |
| 4,734,874 | 3/1988 | Hwang et al. .......................... 361/682 |
| 5,021,763 | 6/1991 | Obear ...................................... 361/682 |
| 5,247,428 | 9/1993 | Yu ........................................... 361/682 |
| 5,257,163 | 10/1993 | Buist et al. .............................. 361/683 |
| 5,294,994 | 3/1994 | Robinson et al. ....................... 361/683 |
| 5,661,630 | 8/1997 | Levins et al. ........................... 361/683 |
| 5,691,881 | 11/1997 | McDonough ........................... 361/682 |
| 5,815,369 | 9/1998 | Quesada .................................. 361/682 |
| 5,822,181 | 10/1998 | Jung ........................................ 361/683 |

*Primary Examiner*—Lynn D. Feild
*Assistant Examiner*—Lisa S. Lea-Edmonds
*Attorney, Agent, or Firm*—Robert E. Bushnell, Esq.

[57] ABSTRACT

An integrated monitor and central processing unit wherein the bottom chassis frame of the monitor is mounted on the CPU frame; the CRT frame, having a front cover, is mounted on the bottom chassis frame and CPU frame; a plate frame, having a main circuit plate coupled therewith, is mounted on the bottom chassis frame and the CRT frame, a side shield being mounted on both sides thereof; a top shield is mounted on the CRT frame, the bottom chassis frame and the plate frame; a drawer chassis is inserted into and mounted on the CPU frame; and a back cover encases the finished assembly. An assembly method also is disclosed.

16 Claims, 24 Drawing Sheets

MONITOR-COUPLED PERSONAL COMPUTER AND METHOD OF ASSEMBLY

CLAIM OF PRIORITY

This application makes reference to, incorporates the same herein, and claims all benefits accruing under 35 U.S.C. §119 from applications entitled MONITOR-COUPLED PERSONAL COMPUTER AND METHOD OF ASSEMBLY earlier filed in the Korean Industrial Property Office on Aug. 20, 1996, and there duly assigned Ser. Nos. 96-34443, 96-25017 and 96-25018 by that Office.

BACKGROUND OF THE INVENTION

1. Field of the Invention

The present invention relates to personal computers. More particularly, the present invention relates to an integral monitor and central processing unit and assembly method.

2. Discussion of the Prior Art

Electrical and electronic appliances must comply with electromagnetic interference (EMI) regulations to be sold or exported. Monitors and central processing units (CPUs) produce various types of EMI which is even more problematic where they are combined because of interactive EMI effects in the couplings therebetween. Additionally, an integrated monitor/CPU is attendant with significant weight that impacts the durability as well as productivity of the machine. The cost of enhancing personal computer (PC) durability weakens its price competitiveness in the market. To overcome this, many methods have been developed to insure that products comply with EMI regulations and have good durability and enhanced productivity.

SUMMARY OF THE INVENTION

The present invention is directed to an integrated monitor/cpu, as well as a method for constructing same, that competitively resolves the issues discussed above.

The apparatus of the invention, includes a bottom chassis frame of the monitor mounted on a CPU frame. A CRT frame, having a front cover, is mounted on the bottom chassis frame and CPU frame. A plate frame, having a main circuit plate coupled therewith, mounts on the bottom chassis frame and the CRT frame, thereafter a side shield being mounted on both sides of the bottom chassis frame. A top shield is mounted on the CRT frame, and the plate frame. A drawer chassis is inserted into and mounted on the CPU frame. A back cover encases the final assembly and mounts thereto.

The present inventive method includes the steps of: (1) coupling the bottom chassis of the monitor onto a CPU frame; (2) coupling a CRT frame on the front of the CPU frame and chassis; (3) coupling a plate with the chassis and the CRT frame; (4) coupling a shield with the CRT frame, the plate and the chassis; and (5) coupling the drawer chassis with the CPU frame and integrating them with a back cover.

In light of the above, a first object of the invention is to provide monitor-coupled personal computer and method for assembling same which complies with EMI regulations and provides enhanced productivity and durability.

A second object of the invention is to provide a monitor-coupled personal computer which eliminates high-voltage current often present in cathode ray tubes used to display images, thus enhancing its productivity.

A third object of the invention is to provide a monitor-coupled personal computer that is easy to assemble.

Additional features and advantages of the invention will be set forth in the following description, claims and drawings.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

Similar reference characters denote corresponding features of the invention consistently throughout the attached drawings.

DETAILED DESCRIPTION OF PREFERRED EMBODIMENT

Figure 1:
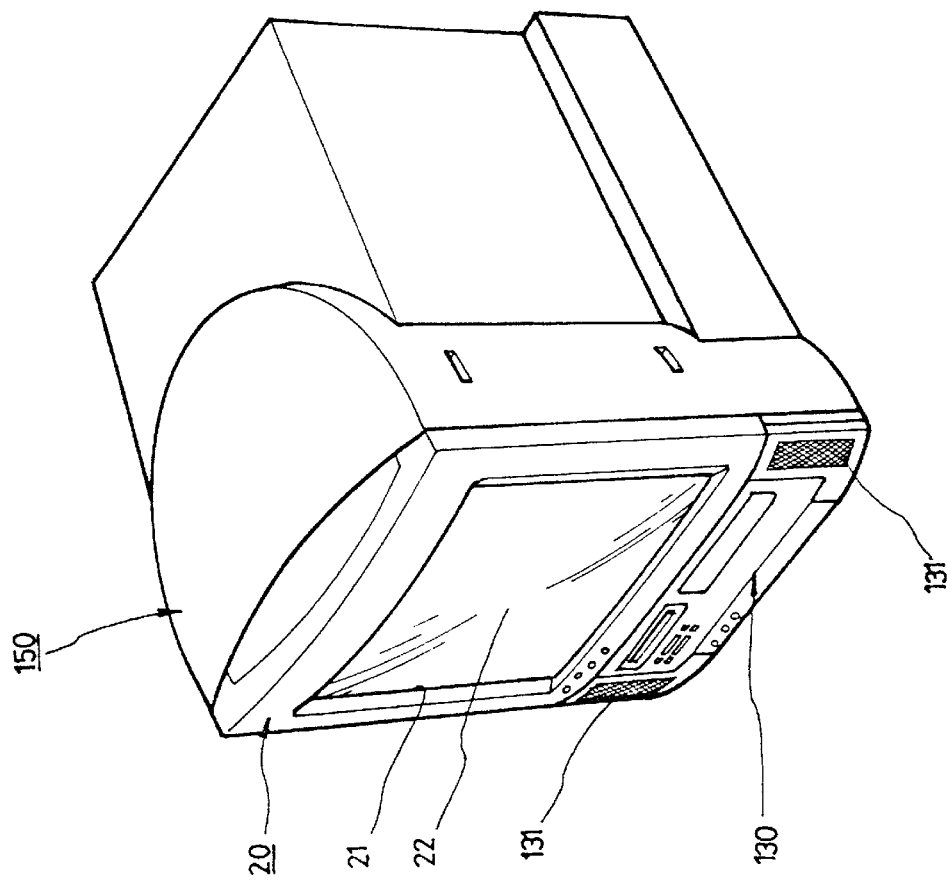
FIG. 1 is an environmental perspective view of the invention.
Figure 2:
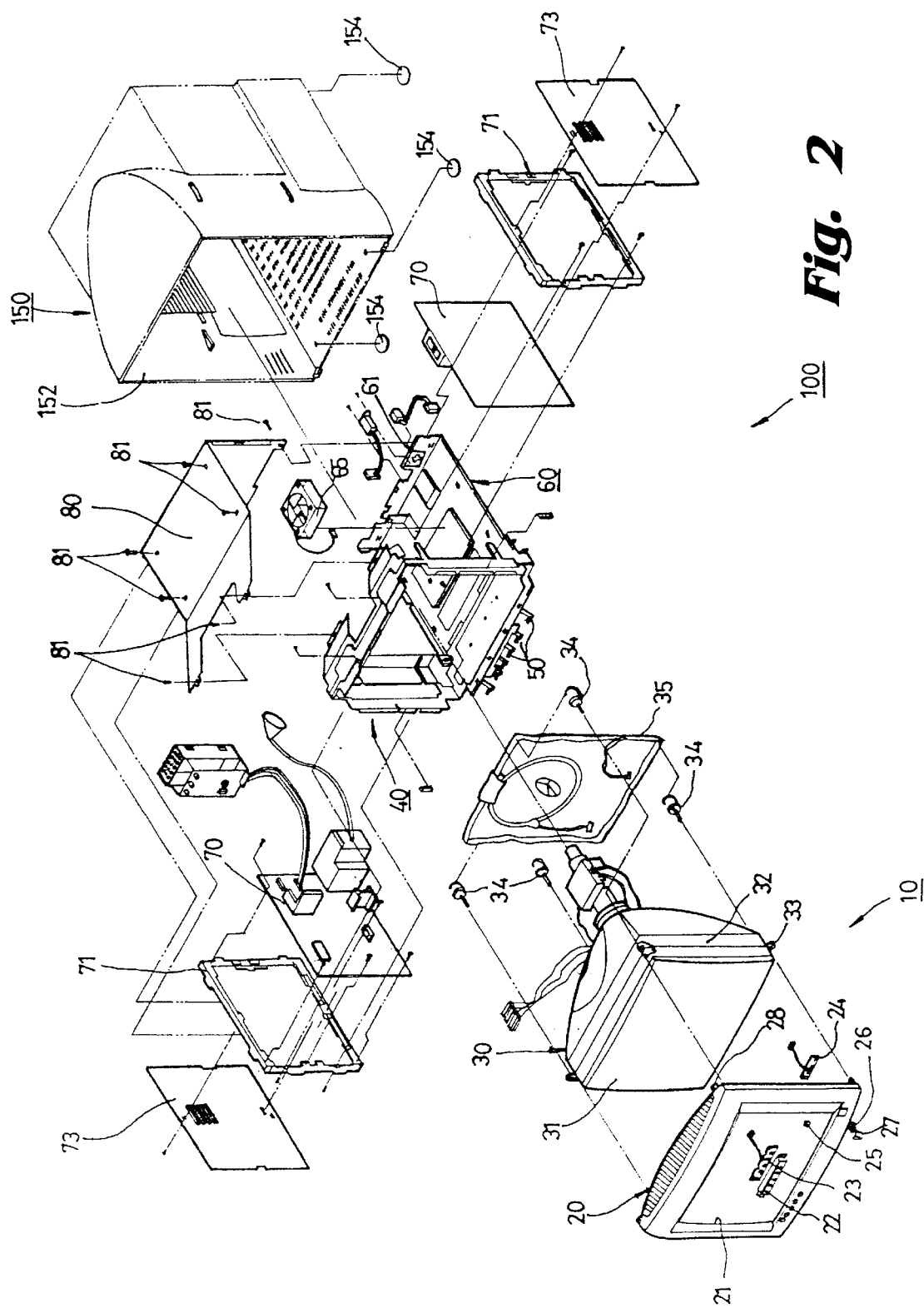
FIG. 2 is a exploded perspective view of the monitor of the present invention.

Referring to FIGS. 1 and 2, the present monitor-coupled personal computer includes a monitor 10, a central processing unit (CPU) 100, and a back cover 150 covering the monitor 10 and the CPU 100.

Figure 3A:
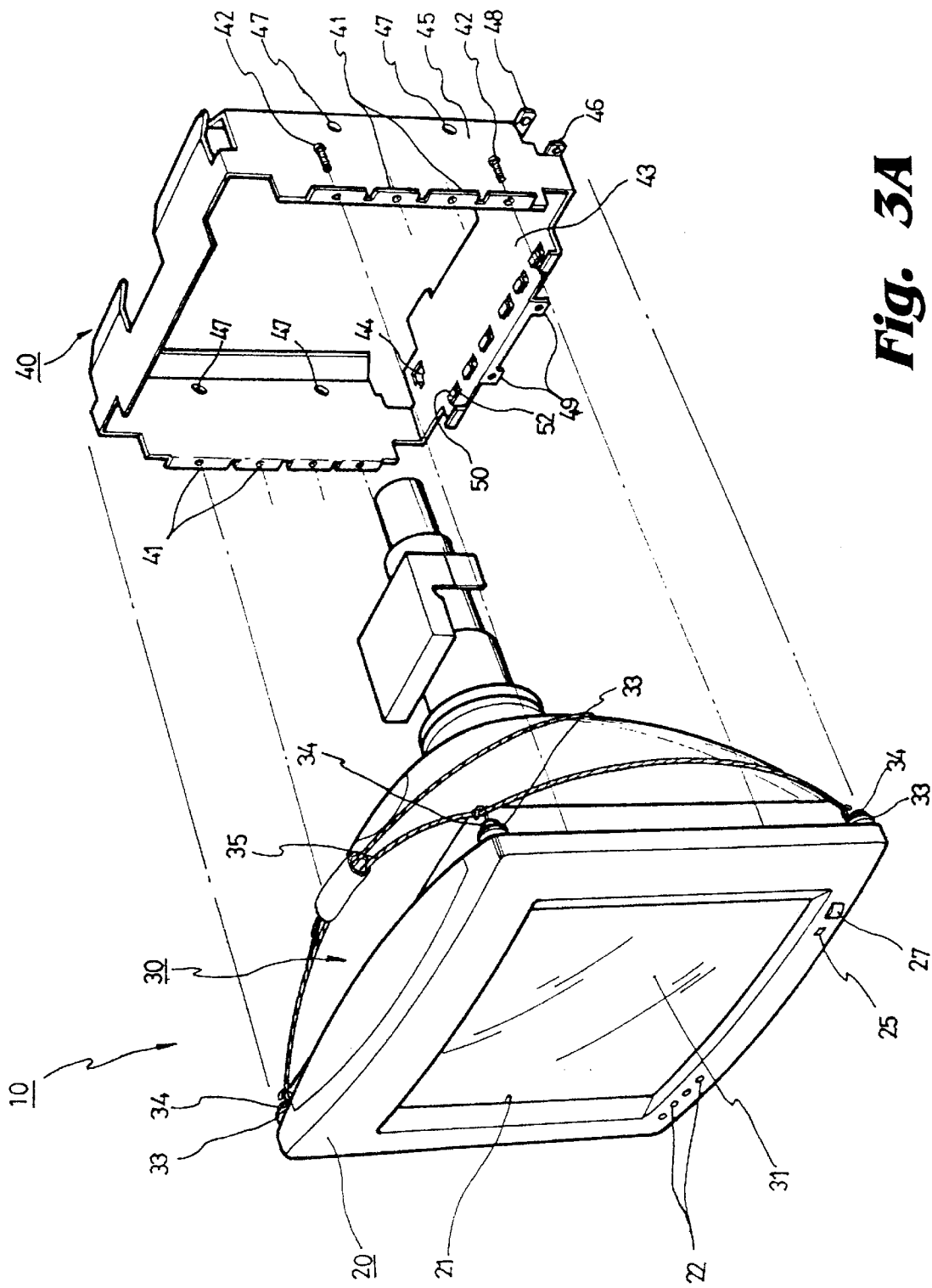
FIG. 3A is a partial exploded perspective view of the monitor of the present invention.

Referring to FIGS. 3A, the monitor 10 includes a front cover 20; cathode ray tube (CRT) 30 on which the front cover 20 is mounted; CRT frame 40 mounted on the CRT 30; a bottom chassis frame 60 fixed under the CRT frame 40; a main circuit plate 70 mounted on both sides of the bottom chassis frame 60; a plate frame 71 supporting the frame 60, a side shield 73, and a top shield 80.

The front cover 20 has a screen hole 21 which exposes the screen 31 of the CRT 30, and a plurality of holes that receive control knobs 22 from the control circuit plate 23 under the screen hole 21. The control knobs 22 are designed in a manner that, when pushed, a toggle switch on the control circuit plate 23 also is pressed to control various functions, such as brightness of the screen. The control circuit plate 23 is connected to the main circuit plate 70 in the monitor 10.

Figure 4:
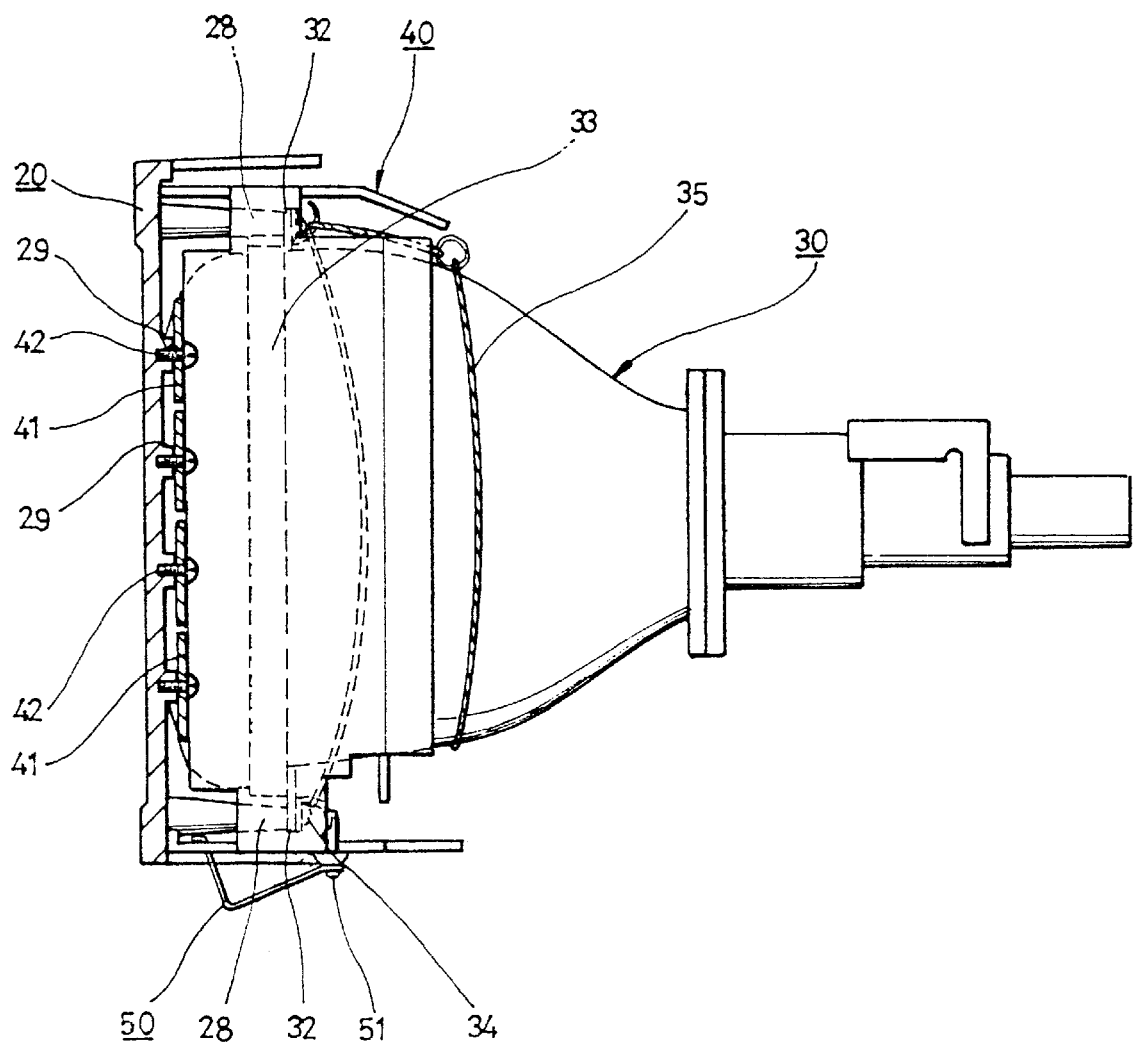
FIG. 4 is a cross-sectional detail view of the present invention.

The front cover 20 has a power lens 25 emitting light received from a light emitting diode (LED) (not shown). A power knob 27, mounted to one side of the power lens 25, is biased toward an original position with a power spring 26. In the back of the power knob 27, a power circuit plate 24 having a power switch for turning on and off the power source by pushing, is installed. The power circuit plate 24 is coupled with the main circuit plate 60. A fixing boss 28 protrudes from the front cover 20 and is coupled to the ears 33 in each of the four corners of the CRT 30. The CRT ears 33 are in the back surface of a CRT band 32. As illustrated in FIG. 3A and 4, each CRT ear is fastened to the fixing boss 28 of the front cover 20 with a screw 34. A degaussing coil 35 is mounted on the back of the CRT 30 to demagnetize adjacent parts.

Figure 3B:
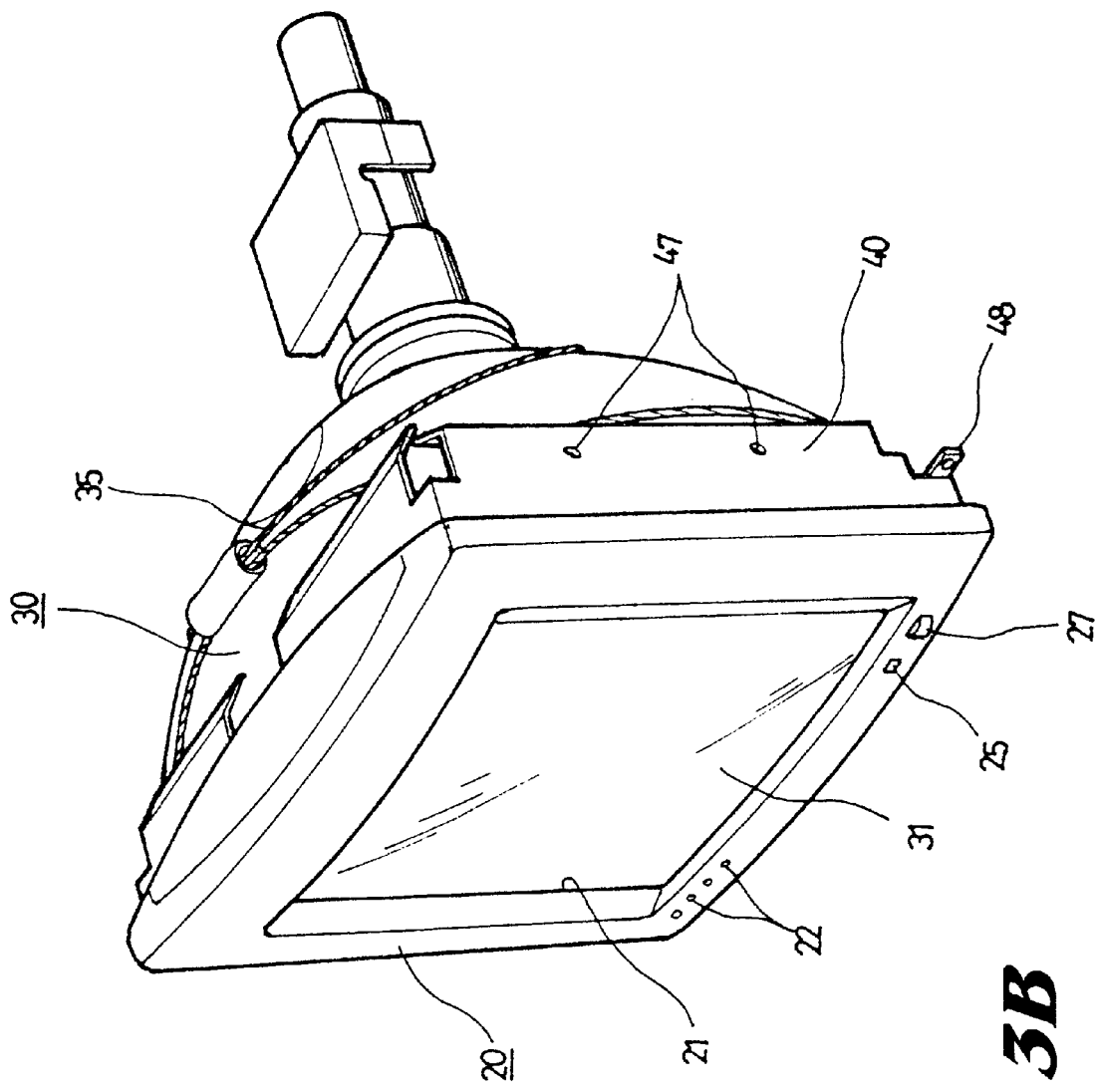
FIG. 3B is a partial perspective view of the monitor of the present invention.

As illustrated in FIGS. 3A and 3B, a CRT frame 40 is mounted about the CRT 30. The CRT frame 40 has a case engaging part 41 in front. The part 41 is fastened with the front cover 20 with screws 42. CPU frame coupling holes 44 are formed on both sides of the lower piece 43. CPU coupling pieces 46 are formed under both sides 45. At the rear of the CPU coupling piece 46, coupling point holes 47 are formed in the upper and lower parts on both sides. Bottom chassis coupling pieces 48 are formed under each lower coupling point hole.

Figure 5:
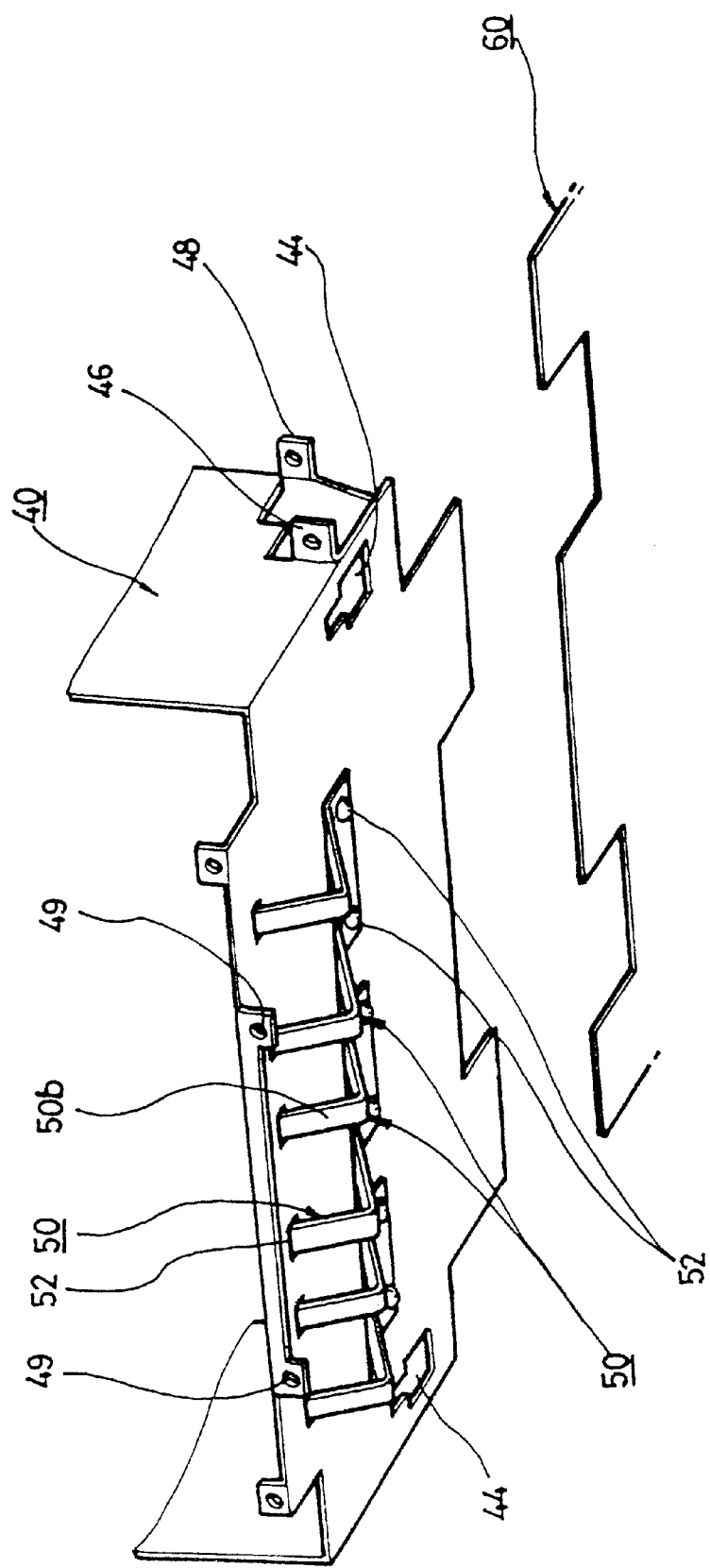
FIG. 5 is a bottom right front perspective view of the cathode ray tube frame and a grounding device.
Figure 6:
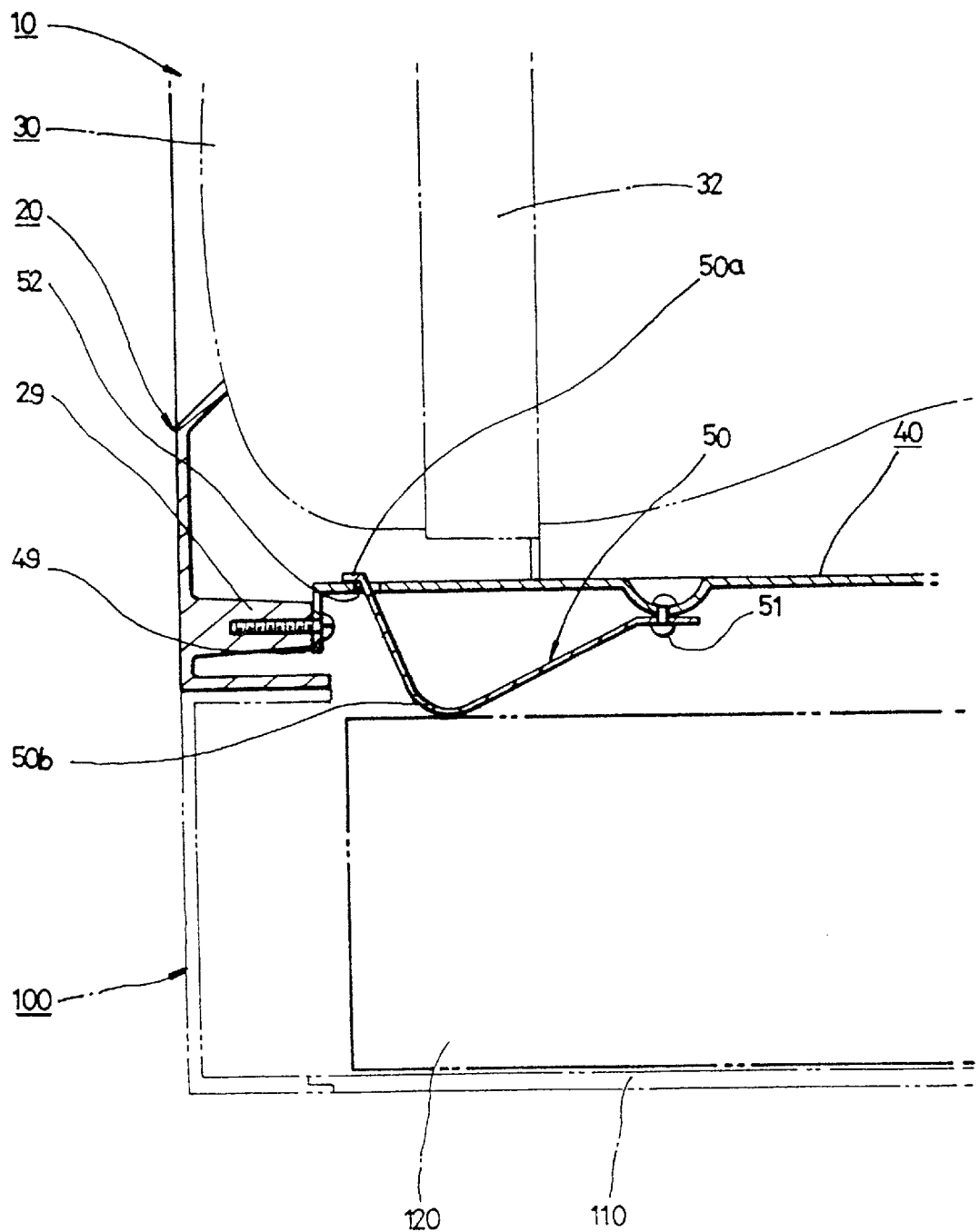
FIG. 6 is a partial cross-sectional detail view of the embodiment shown in FIG. 5.

As illustrated in FIGS. 5 and 6, front surface fixing pieces 49 are fastened to a fixing boss 28 of the front case 20 with a screw 29 in front of the CRT frame 40. Grounding plates 50 are fixed to the bottom surface of the lower pieces 43 in the CRT frame by rivets 51. A free end 50a of the grounding plates 50 hooks in the hooking hole 52 in the CRT frame 40. Each of the grounding plates has contact part 50b which exerts pressure against the drawer chassis 120.

Figure 7:
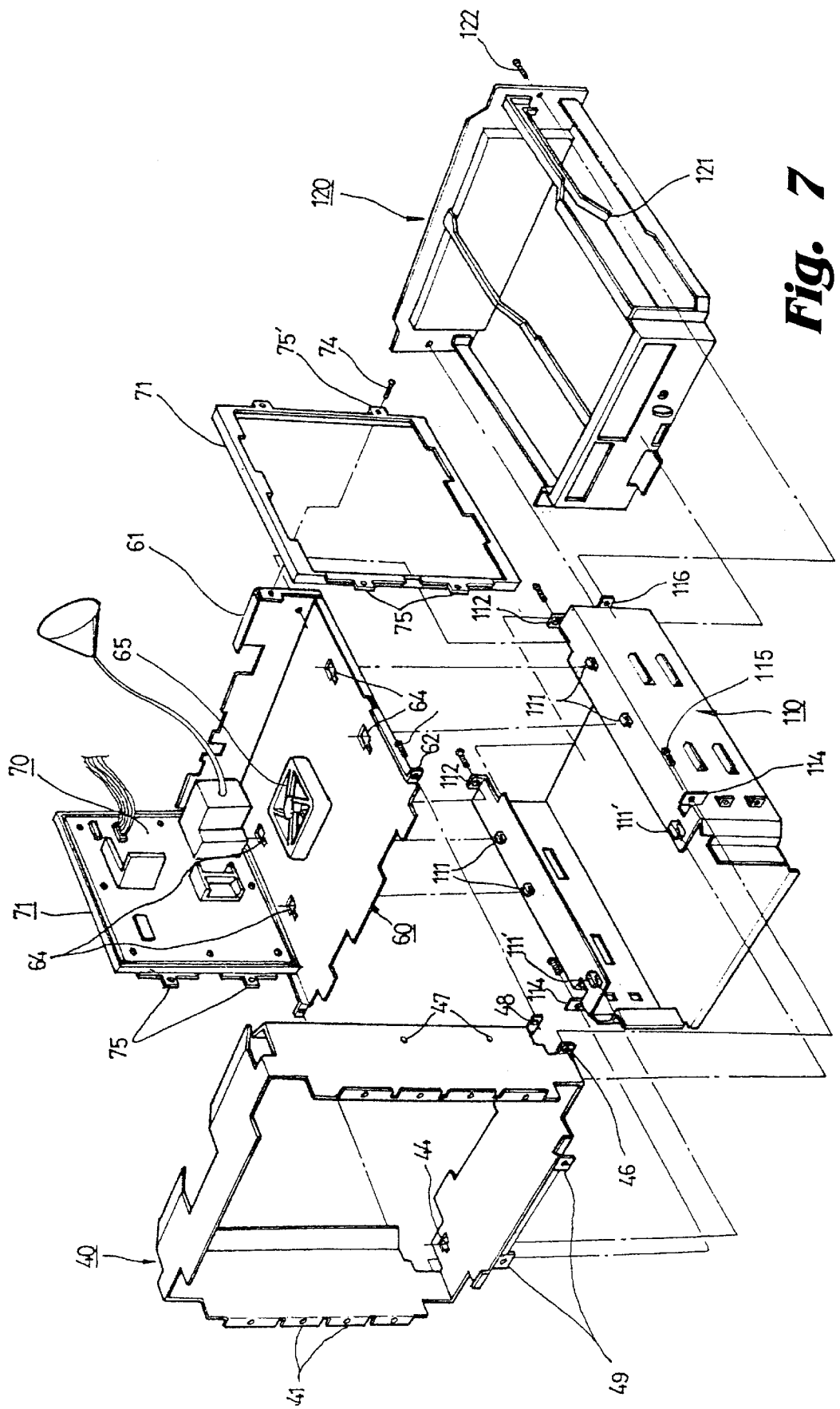
FIG. 7 is a partial exploded perspective view of interconnecting frames of the present invention.

As illustrated in FIGS. 2 and 7, a plate frame 71, on which the main circuit plate 70 is mounted, is mounted on the bottom chassis frame 60. The main circuit plate 70 is mounted on the inner surface of the plate frame 71 with a screw 72. A side shield 73 is mounted outside of the main circuit plate 70, forming an assembly.

Figure 8:
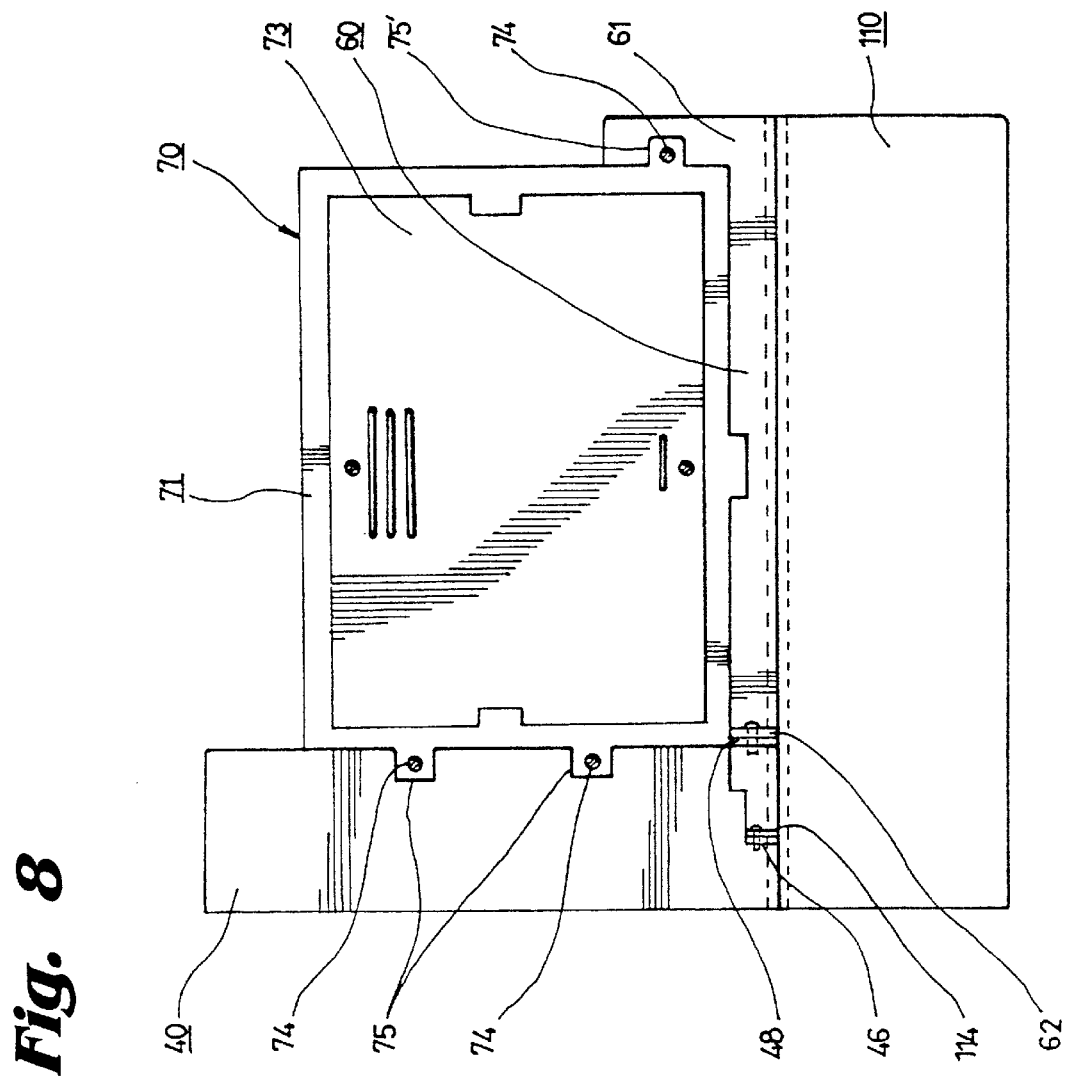
FIG. 8 is a right side elevational view of the embodiment shown in FIG. 7 as assembled.

As illustrated in FIGS. 7 and 8, the plate frame 71 has multiple fixing pieces 75 and 75' fixable to the CRT frame 40 and the bottom chassis frame 60 with screws 74. The back fixing piece is fixed to the rear stand-up piece 61 of the bottom chassis frame 60.

Figure 9:
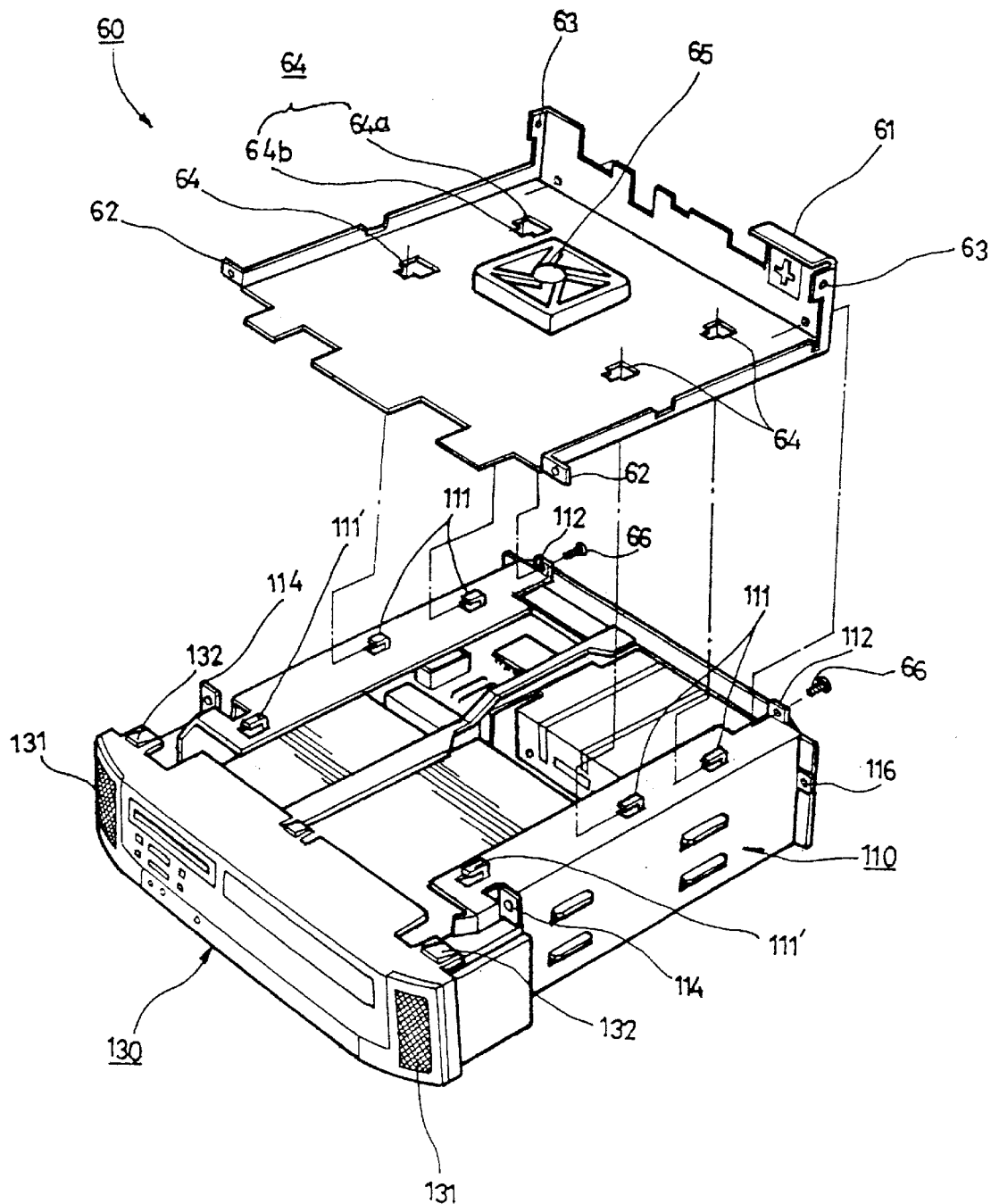
FIG. 9 is a partial exploded perspective view of a bottom frame for the monitor and assembled frame system for the central processing unit.
Figure 10:
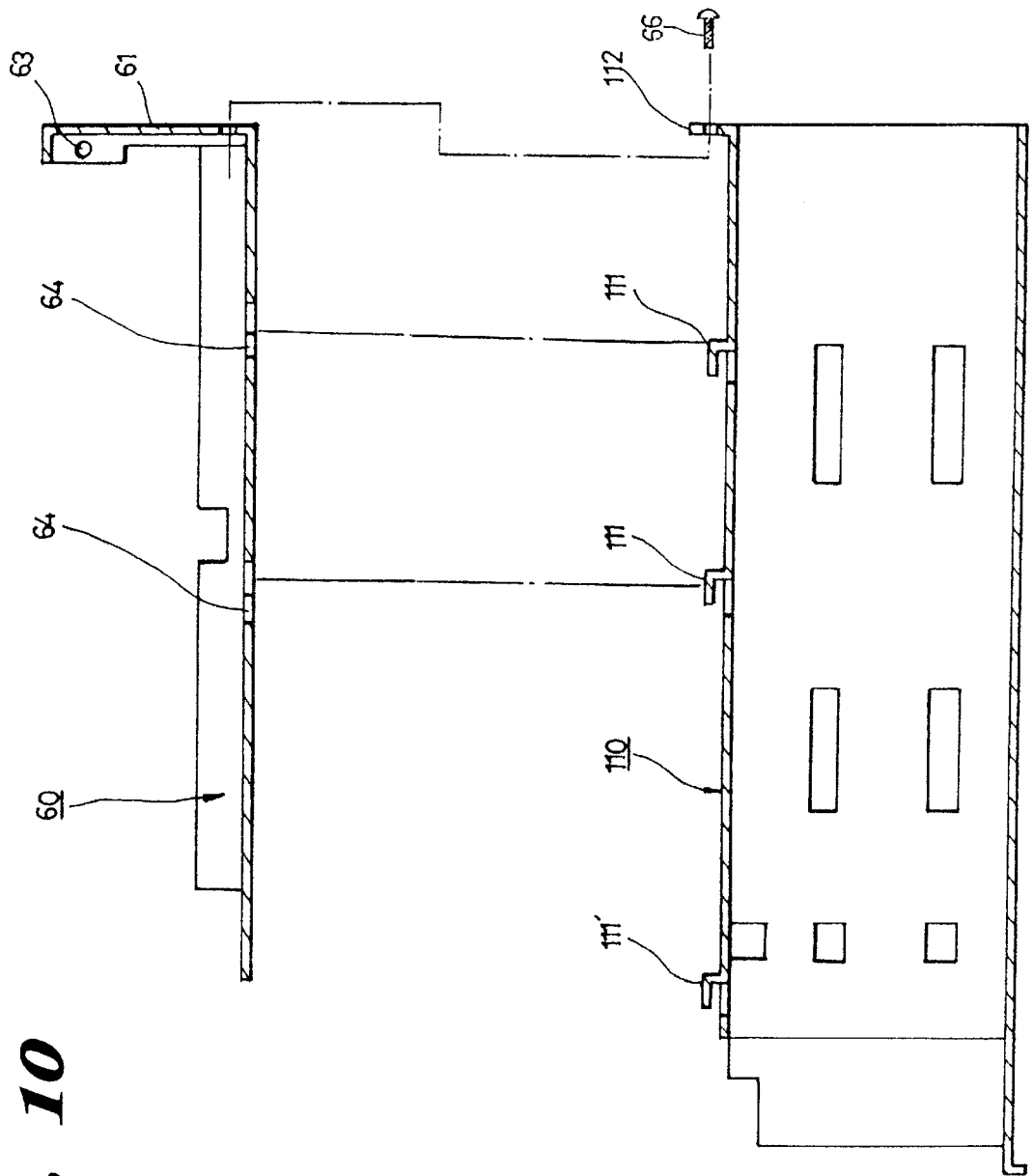
FIG. 10 is an exploded cross-sectional detail view of the embodiment shown in FIG. 9, prior to assembly.
Figure 11:
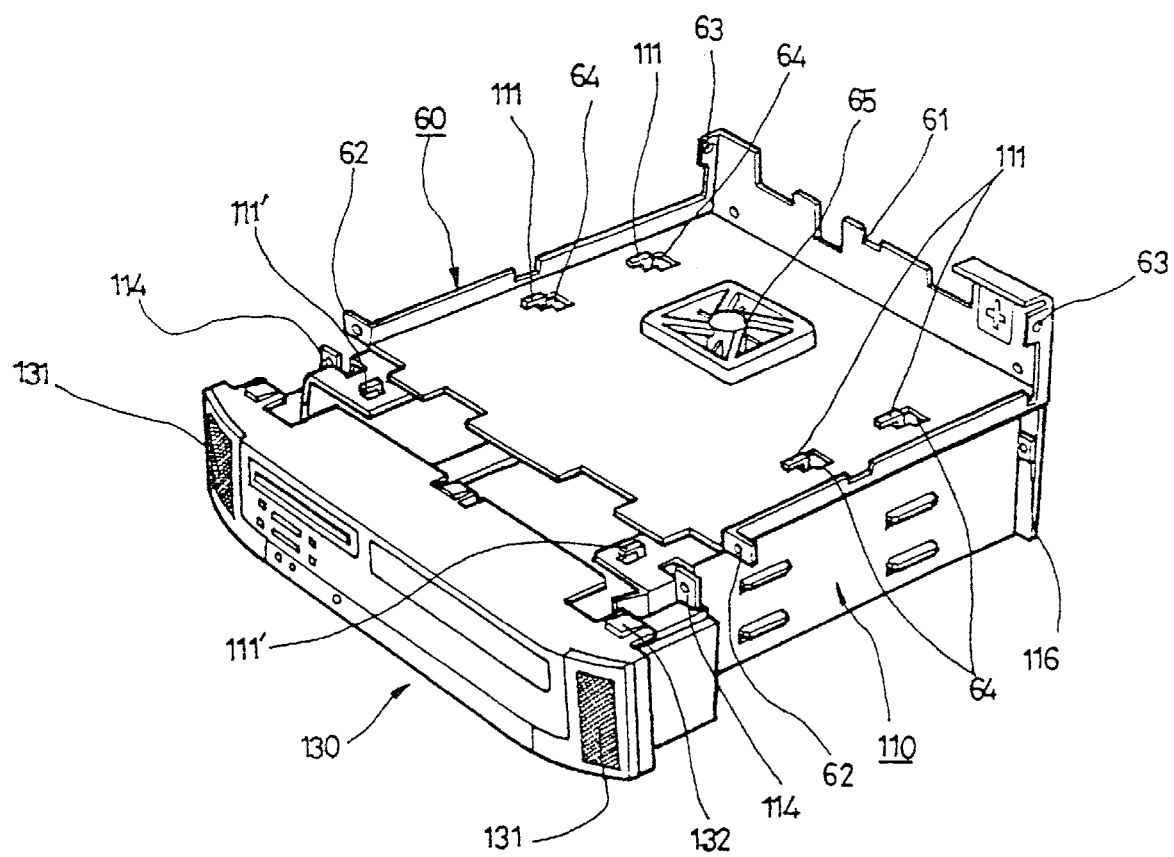
FIG. 11 is a top front perspective view of the embodiment shown in FIG. 10, as assembled.
Figure 12:
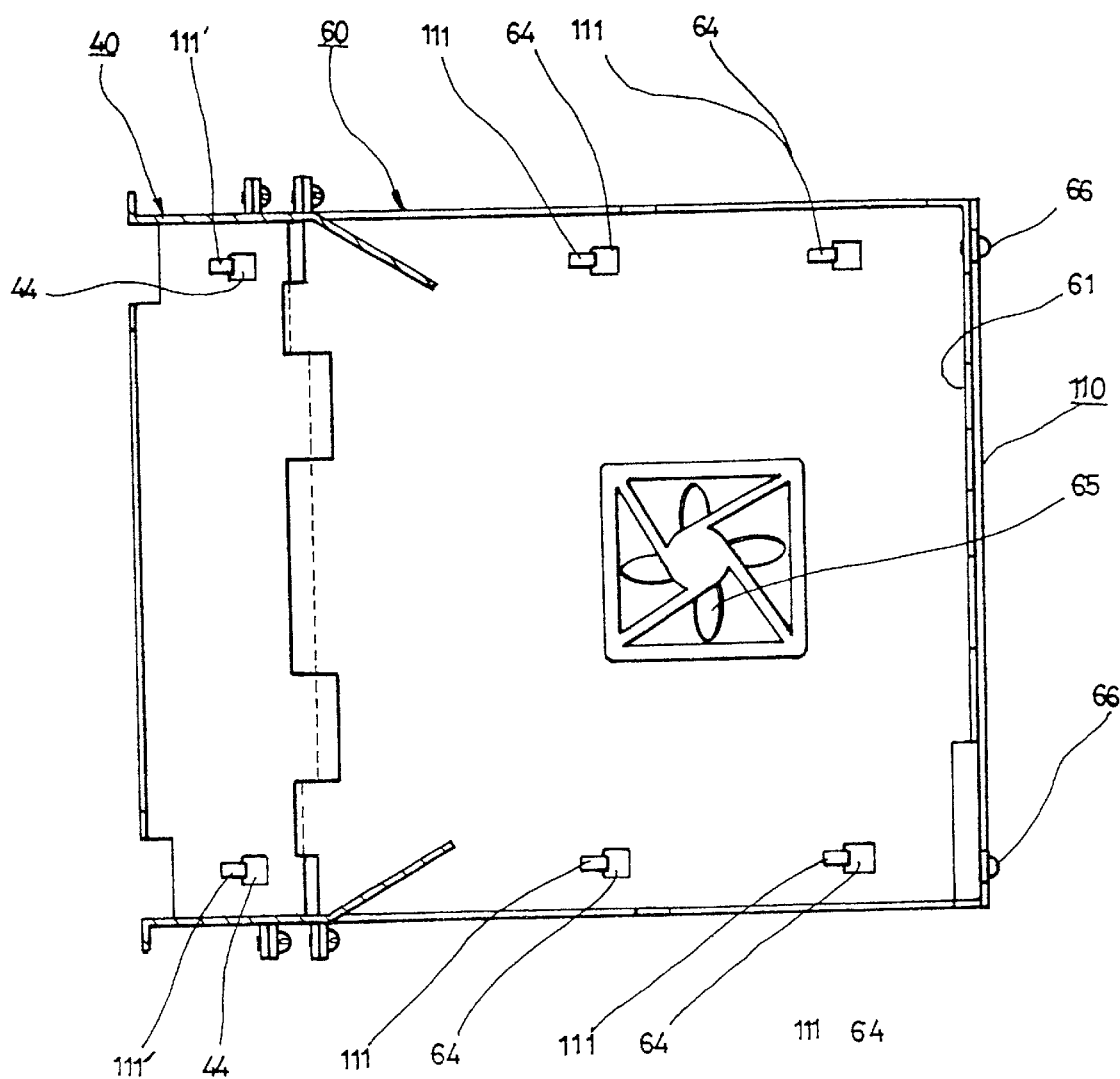
FIG. 12 is a plain view of the embodiment shown in FIG. 11, as assembled.

Referring to FIGS. 9–11, the bottom chassis frame 60 of the monitor 10 is an important component for connecting the monitor 10 and the CPU 100. The bottom chassis frame 60 is configured to be coupled on the top of the CPU frame 110.

In the bottom chassis frame 60, a chassis fixing piece 62 is folded to be integrated with the bottom chassis coupling piece 48 of the CRT frame 40. The rear stand-up piece 61 has screw holes 63 with which to fix the rear fixing piece 75' of the plate frame 71.

The bottom surface of the bottom chassis frame 60 has CPU frame coupling holes 64 in four positions. Coupling hooks 111 of the CPU frame are hooked to holes 64. The CPU coupling hole 64 has an insertion area 64a in which the hooks are inserted, and a locking area 64b with which the hook 111 mates. The four hooks 111 extend from both upper sides of the CPU frame 110.

In the center part of the bottom chassis frame 60, a motor fan 65 is mounted for expelling heat generated inside the CPU part 100. The motor fan 65 is mounted to blast downward, so that heat generated in the circuit components inside the CPU frame 110 is cooled.

As illustrated in FIG. 10, the bottom chassis frame 60 is placed on the CPU frame 110 with the coupling hooks 111 of the CPU frame inserted into insertion area 64a. Thereafter, the bottom chassis frame 60 is pushed back relative to the hooks 111 so that hooks engage and snap into place at the locking area 64b. When the bottom chassis frame 60 is coupled with the CPU frame 110 by the coupling means, the rear stand-up part 61 of the bottom chassis frame 60 mates with the coupling piece 112 at the rear of the CRT frame 40. The coupling piece 112 then may be fastened to the rear stand-up piece 61 with a screw 66.

Figure 13:
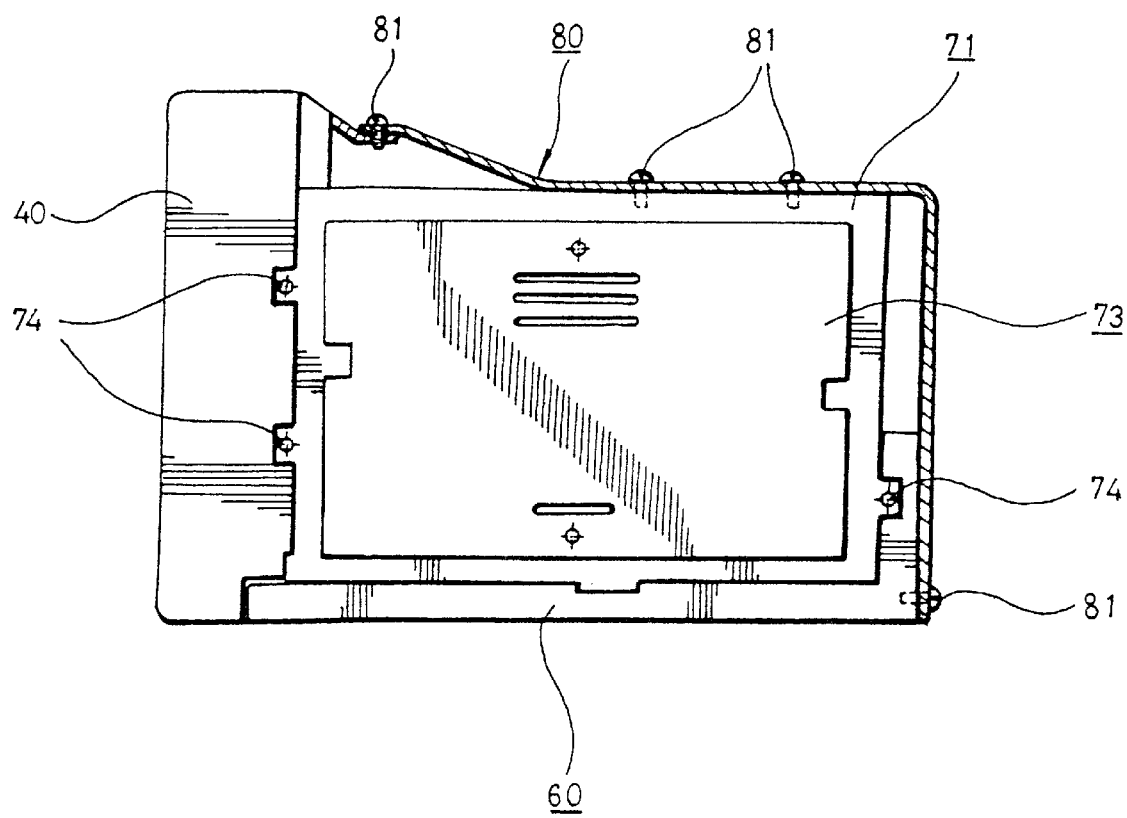
FIG. 13 is a right side elevational view, partially in cross section, of the monitor, bottom frame and side plate.

Referring to the FIGS. 2 and 13, the top shield 80, for shielding the top of the CRT 30, is mounted on the CRT frame 40, the plate frame 71 and the rear stand-up piece 61 of the bottom chassis frame 60 with screws 81.

The device also includes a shield that shields the emission of electromagnetic waves from the rear of the CRT 30. The top shield 80 is completely fixed to the plate frame 71 on both sides of the CRT frame 40 and the bottom chassis frame 60. This fastening convention enhances stability. Moreover, when the CRT frame 40, the plate frame 71 and the bottom chassis frame 60 are integrally coupled, each reinforces the others structurally.

Figure 14:
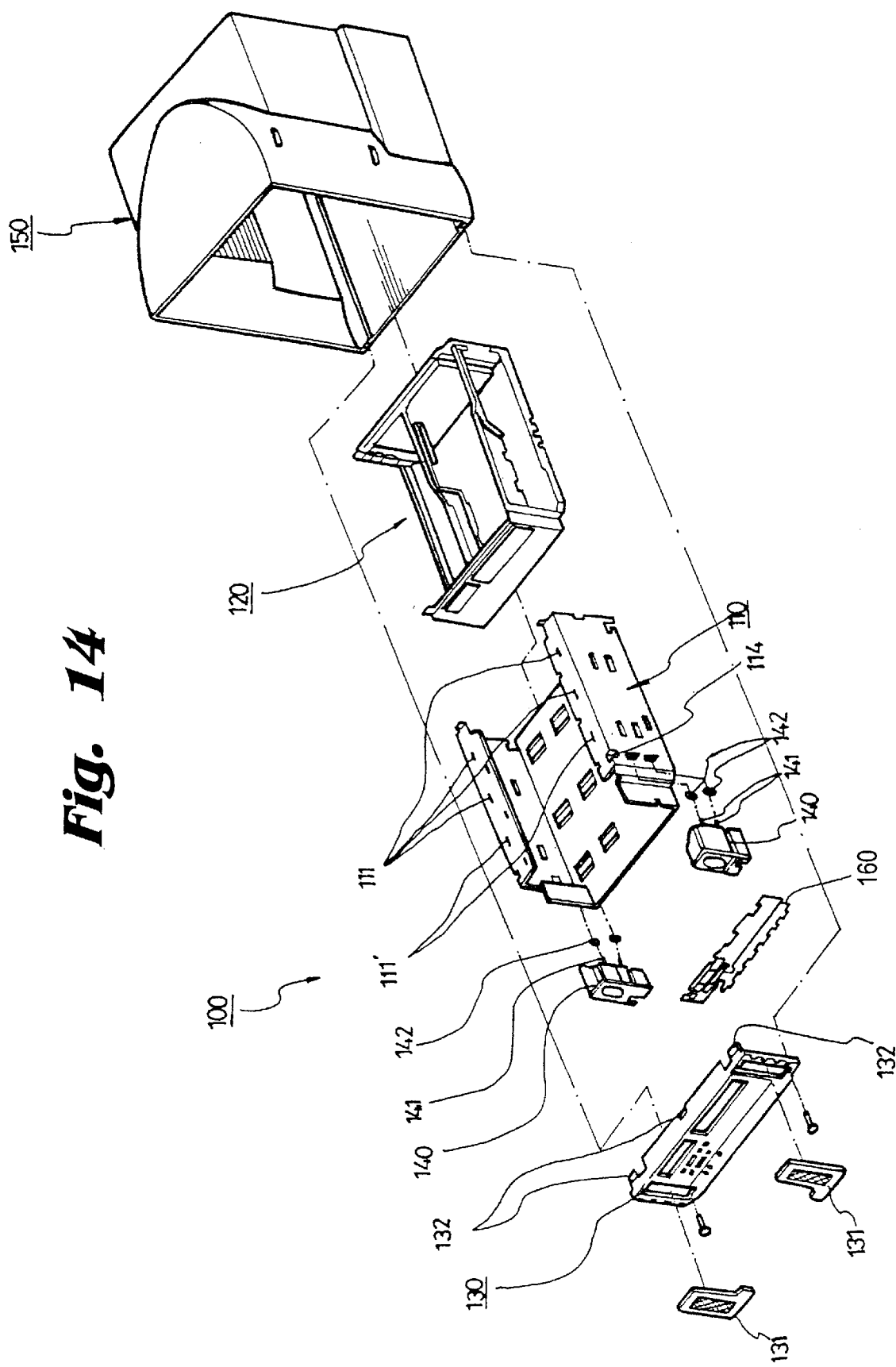
FIG. 14 is a partial exploded perspective view of the central processing unit frame, cover and back cover of the invention.
Figure 15:
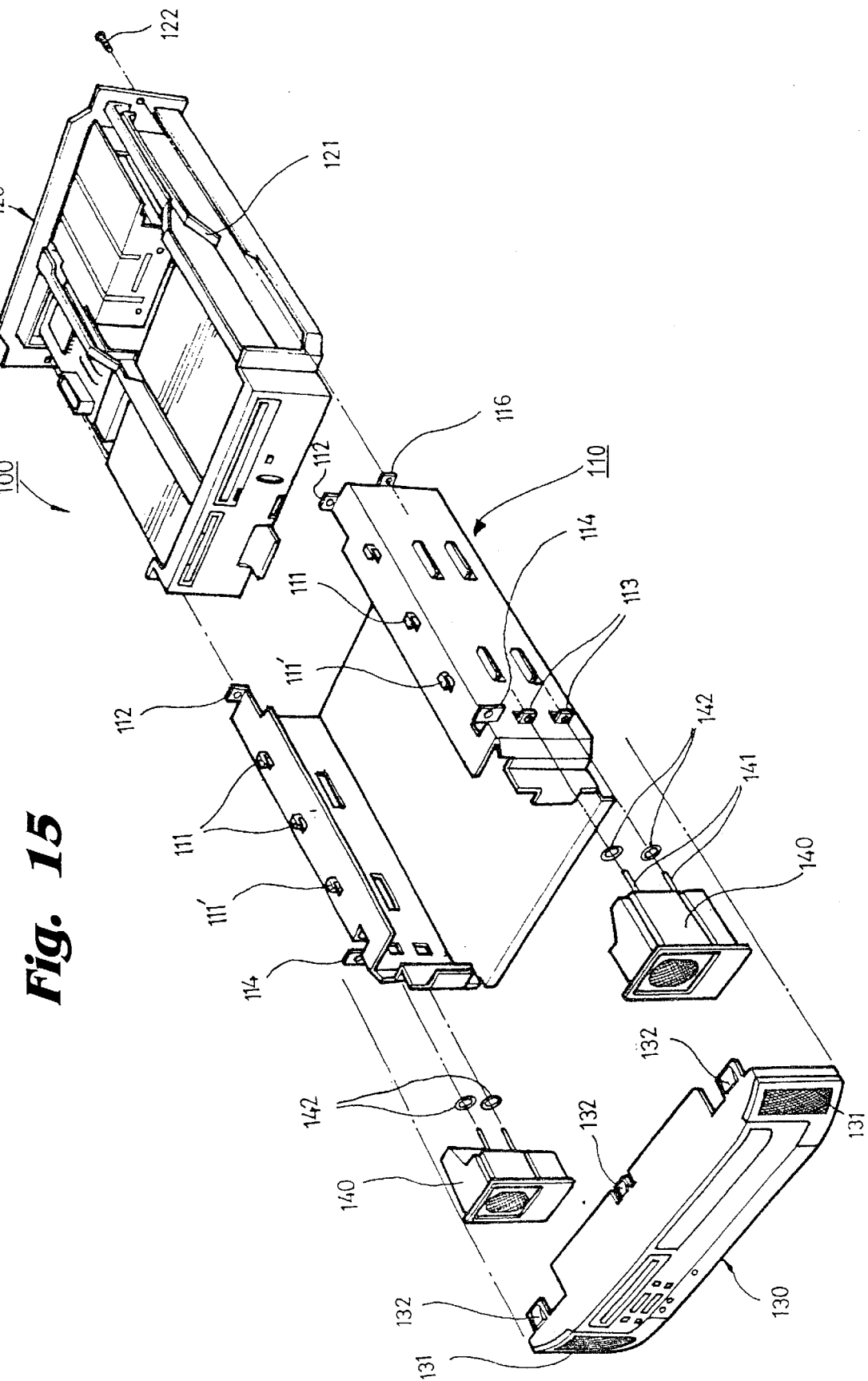
FIG. 15 is a partial exploded perspective view of the frame work and cover for the central processing unit.
Figure 16:
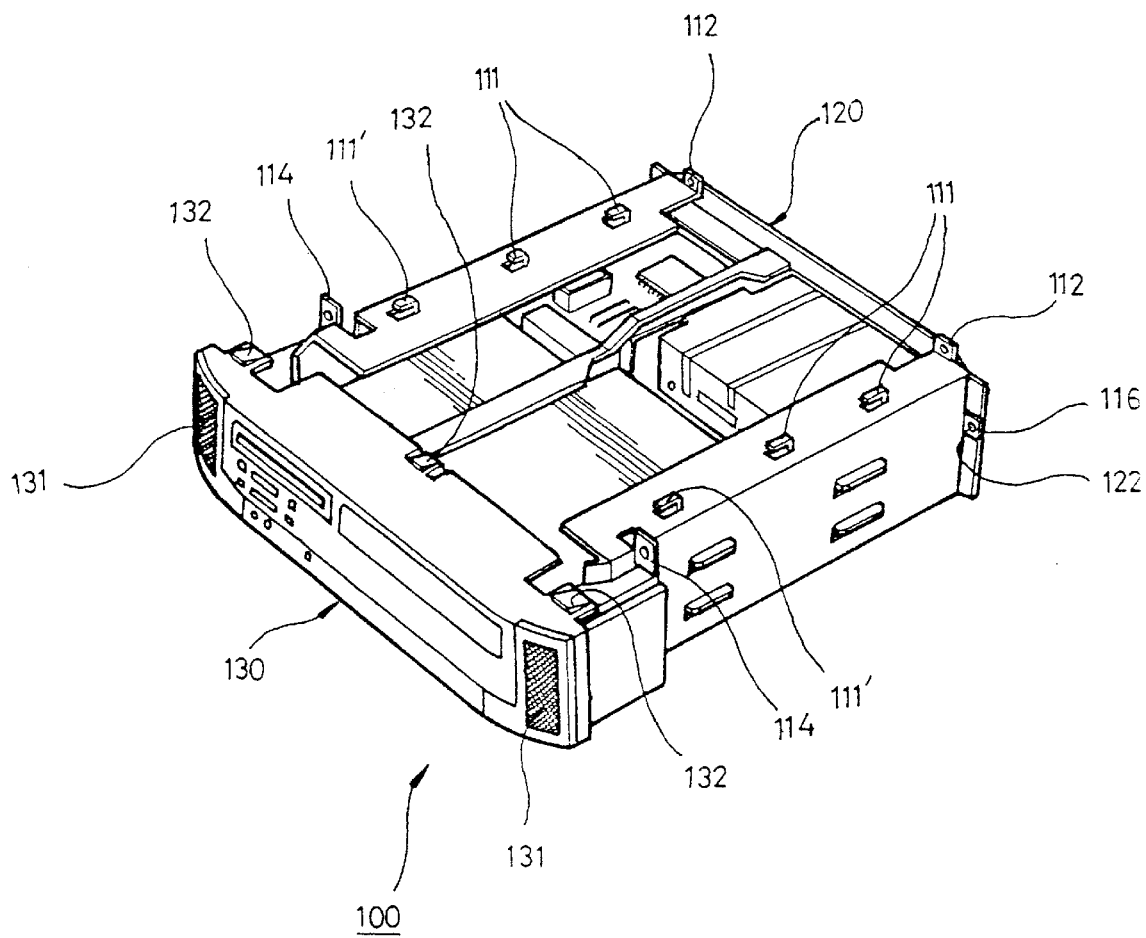
FIG. 16 is a top front perspective view of the embodiment shown in FIG. 15, as assembled.

As illustrated in FIGS. 14 to 16, the CPU 100 of the invention roughly consists of the CPU frame 110, a drawer chassis 120 and the CPU front cover 130. The CPU frame 110 has a coupling axis part 141 for mounting a speaker 140 on each side. The coupling axis part 141 is fixed in the fixing piece 113 on both sides of the CPU frame 110. Each of the fixing pieces 114, mounted outside the hooks 111', are coupled to the CPU coupling piece 46 of the CRT frame 40 by a screw 115.

In the front of the CPU frame 110, there is the front cover 130 for mounting a speaker cover 131 on each side. The CPU front cover 130 is fixed to the back cover 150 by a screw 151. The CPU front cover 130 has a snap 132 that engages with the front cover 20 of the monitor 10.

As shown in FIG. 14, a front shield 160, restricts electromagnetic waves toward the front of the device.

In the CPU frame 10, as illustrated in FIGS. 15 and 16, the drawer chassis 120 may be inserted and drawn out like a drawer. The drawer chassis 120 has a stopper bracket 121 on both sides, so that it stops at the positions designed to stop in the middle of the insertion of the CPU frame 110. After the drawer chassis 120 is inserted into the CPU frame 110, it is fixed to the drawer fixing piece 116 with a screw 122.

The back cover 150 has an aperture 152 into which the monitor 10 and the CPU 100 are inserted. The back cover 150 is fastened to the front cover 20 of the monitor 10 with a screw 153. A rubber foot 154 is installed on the bottom of the cover 150.

Figure 17:
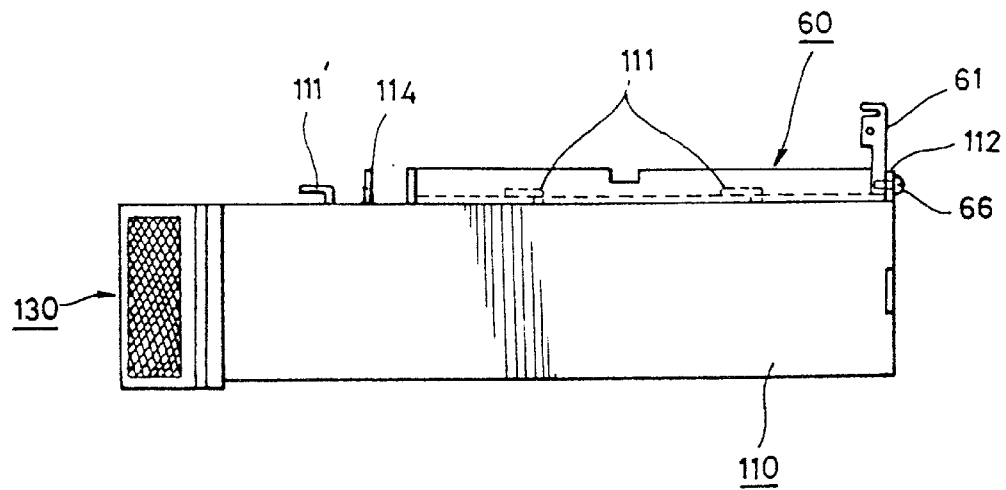
FIG. 17 is a right side elevational view of the embodiment shown in FIG. 16.
Figure 18:
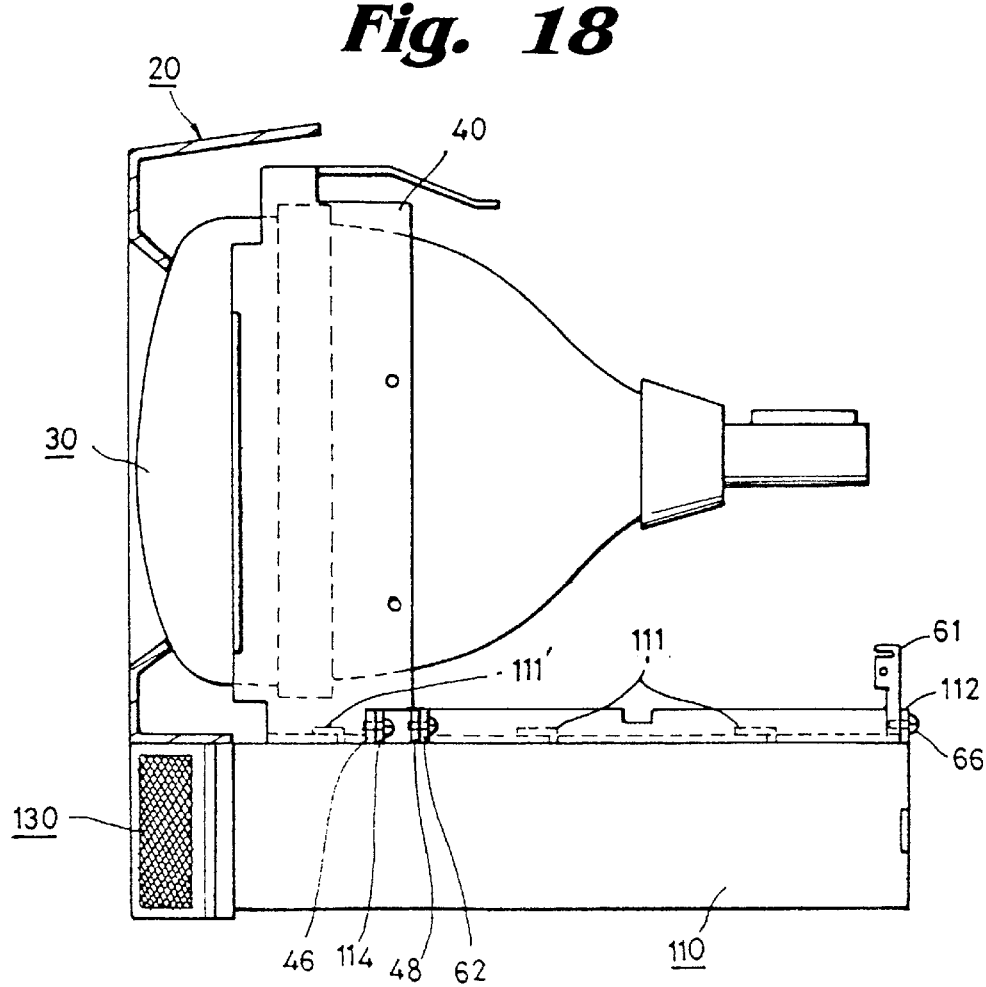
FIG. 18 is a right side elevational view, partially in cross section, of the embodiment shown in FIG. 16, with a monitor and cover mounted thereon.

Referring to FIGS. 16 and 17, the present method includes mounting the CPU frame 110 on the bottom chassis frame 60. The CPU frame 10 is preassembled with components such as the speaker 140, front shield 160 and front cover 130. The hooks 111 of the CPU frame 110 are inserted into the CPU frame coupling holes 64 of the bottom chassis frame 60 respectively. The bottom chassis frame is pushed rearwardly into the locked position. This causes the rear stand-up piece 61 to mate with the coupling piece 112 of the CPU frame 110. The rear stand-up piece 61 is fastened to the coupling piece 112 by a screw, thus the bottom chassis frame 60 is permanently coupled with the CPU frame 110. The two coupling points are rearwardly positioned is so that the screws may be removed easily to service the machine. Second, referring to FIGS. 3A, 17 and 18, the CRT frame 40, the bottom chassis frame 60 and CPU frame 110 are joined. The CRT frame 40 then is assembled with the front cover 20 and the CRT 30 with a screw.

Referring again to FIGS. 17 and 18, after the front hooks 111' are inserted into the frame coupling holes 44 of the CRT frame 40, the CRT frame 40 is pushed toward the bottom chassis frame 60 so that the hooks 111' are tightly engaged. The CPU coupling piece 46 of the CRT frame 40 is flush with the fixing piece 114 of the CPU frame 110, and simultaneously, the bottom chassis coupling piece 48 of the CRT frame 40 is flush with the chassis fixing piece 62 of the bottom chassis frame 60. The CPU coupling piece 46 and the fixing piece 14 and the bottom chassis coupling piece 48 and the chassis fixing piece 62 are joined permanently. The lower CPU frame 110 and the bottom chassis frame 60 are permanently joined by the CRT frame 40, thereby enhancing stability.

Figure 19:
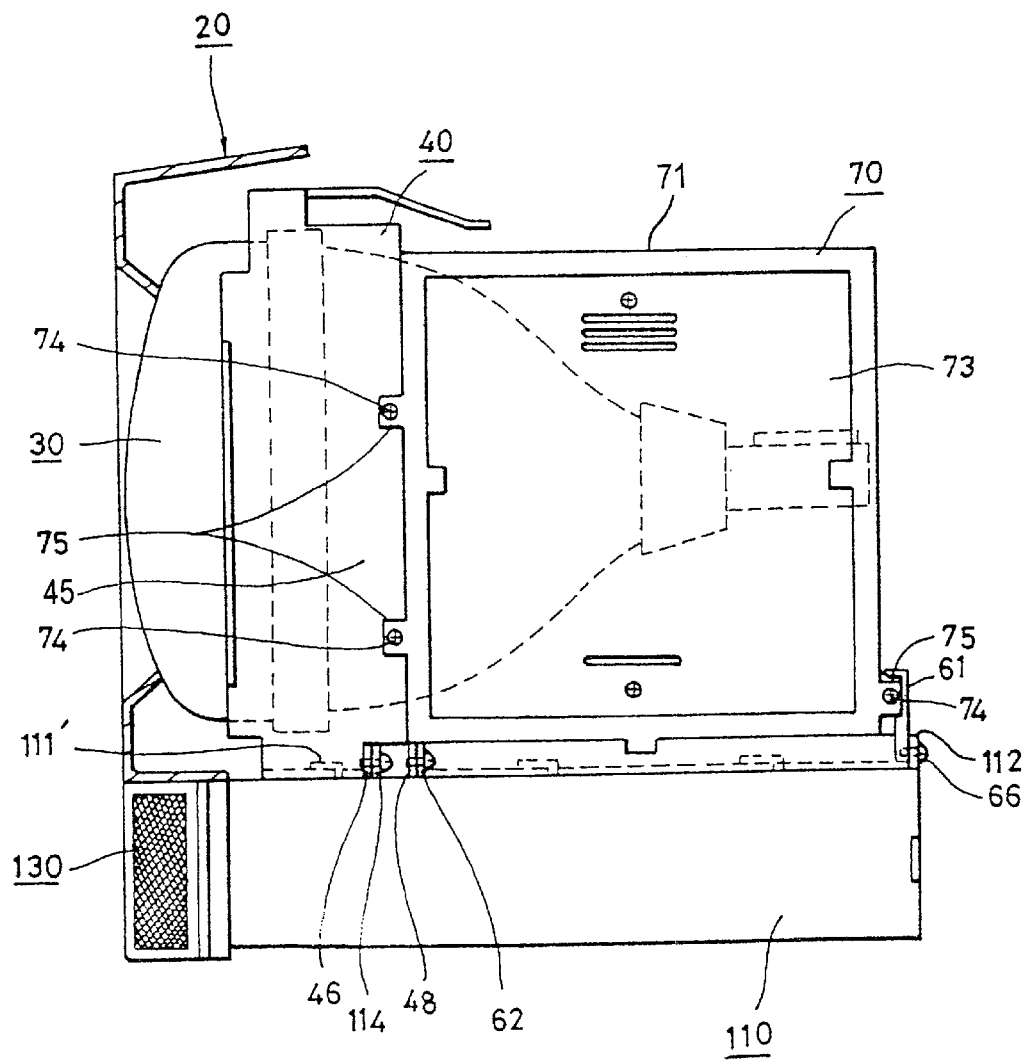
FIG. 19 is right side elevational view of the embodiment shown in FIG. 18, including a side panel.
Figure 20:
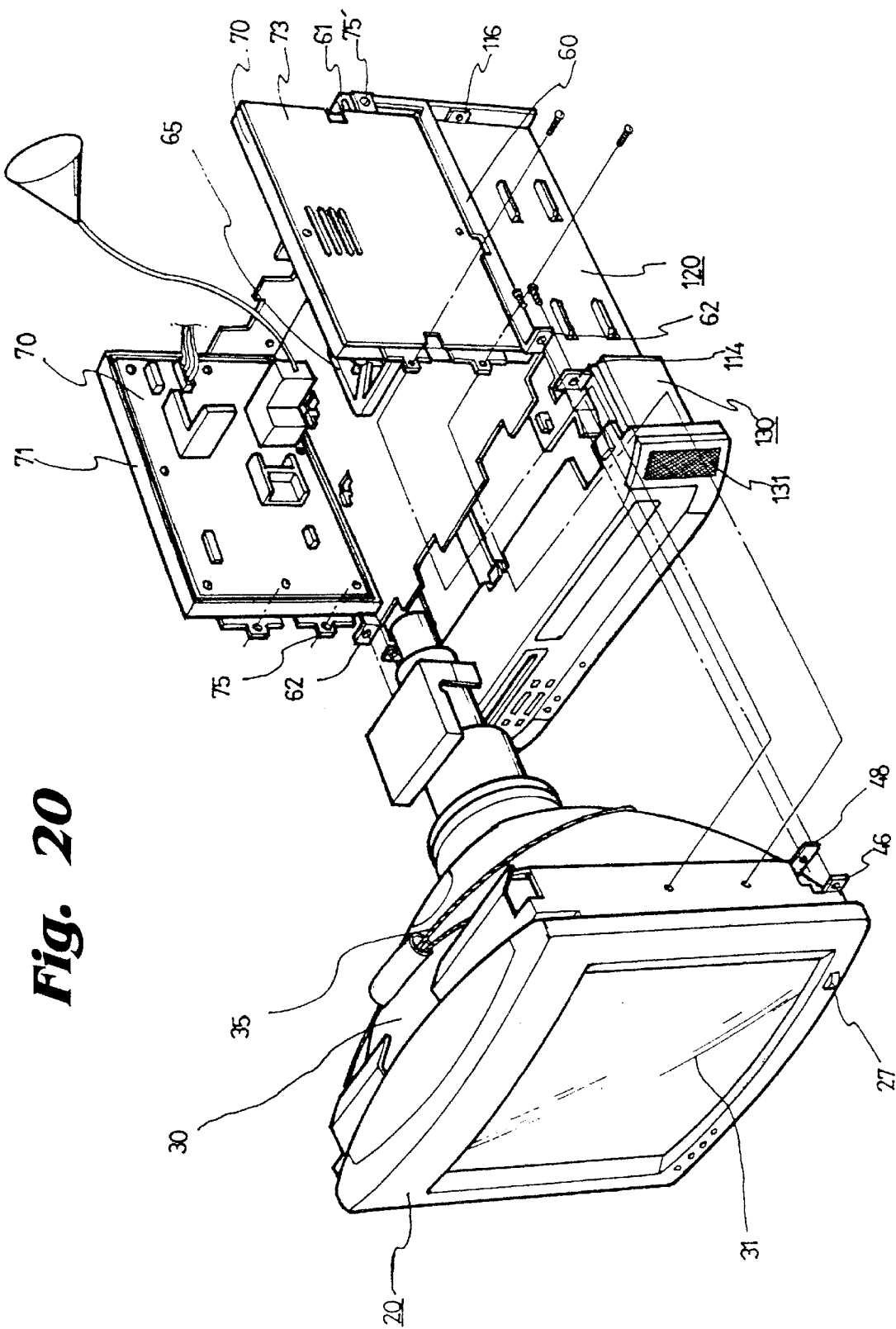
FIG. 20 is a partial exploded perspective view of the central processing unit frame work, side panels and monitor.

Third, referring to FIGS. 17 and 19, the third coupling process is shown. Before initiating the third coupling process, the main circuit plate 70 and the side shield 73 are assembled onto the plate frame 71, forming an assembly. Each plate frame 71 is positioned on each side of the bottom chassis frame 60. The plate frame 71 has front/back fixing pieces 75 and 75' on both sides flush with the rear stand-up piece 61 of the CRT frame 40 and the bottom chassis frame 60. The front/back fixing pieces 75 and 75' are fastened to both side pieces 45 of the CRT frame 40 and the rear stand-up piece 61 of the bottom chassis frame 60 with screws. This step enhances the stability of the CRT frame 40.

Figure 21:
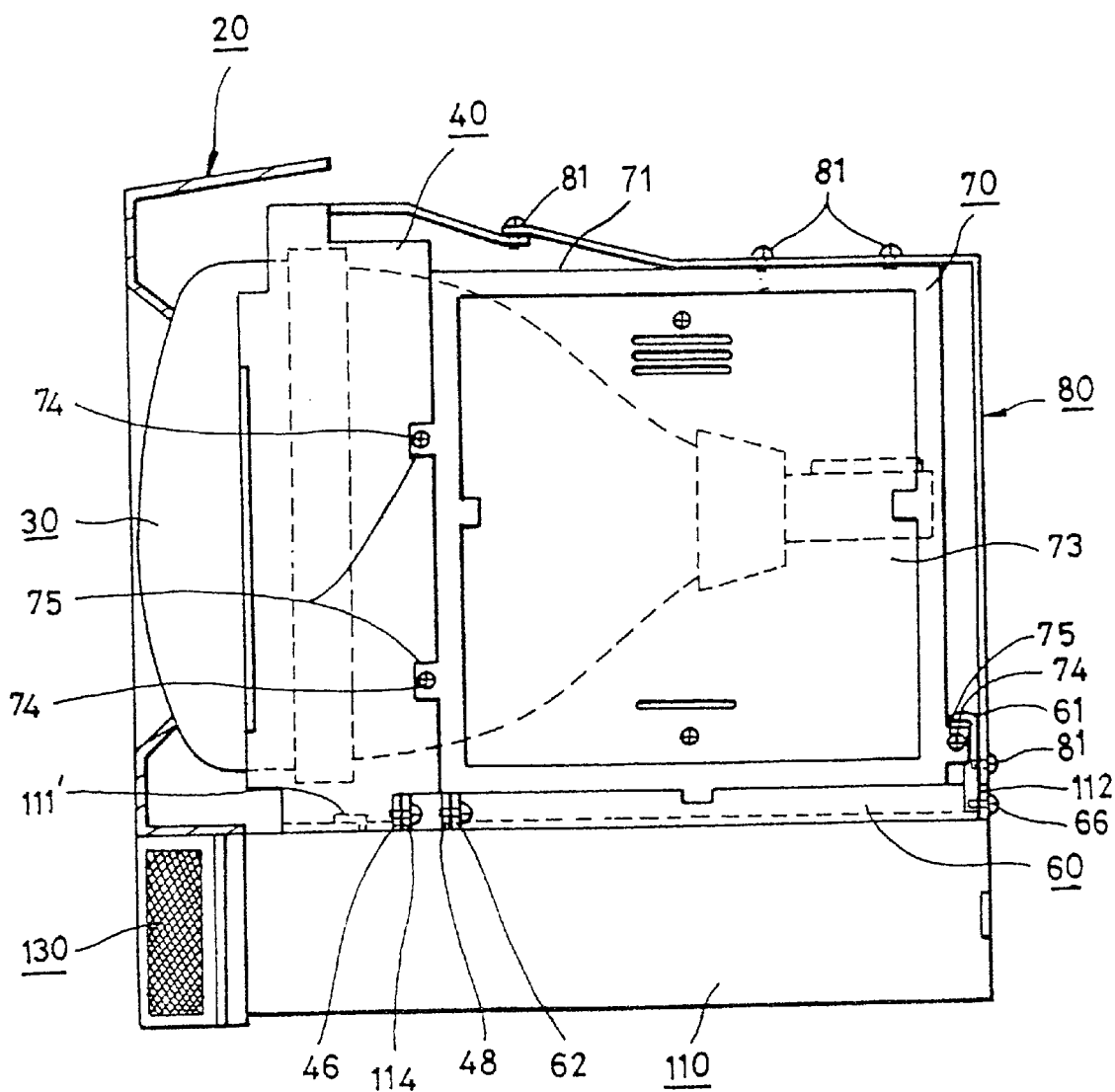
FIG. 21 is a side elevational view, partially in cross section, of the embodiment shown in FIG. 20.

Referring to FIG. 21, the fourth coupling process is shown. The top shield 80 is joined with the CRT frame 40, the plate frame 71 and the bottom chassis frame 60 with screws 81. The CRT 30, excluding the screen 31, is encased by the side shield 73, top shield 80, and, as it is mounted on the CRT frame 40, the bottom chassis frame 60 and the plate frame 71, thus shielding the emission of electromagnetic waves in compliance with EMI regulation.

Figure 22:
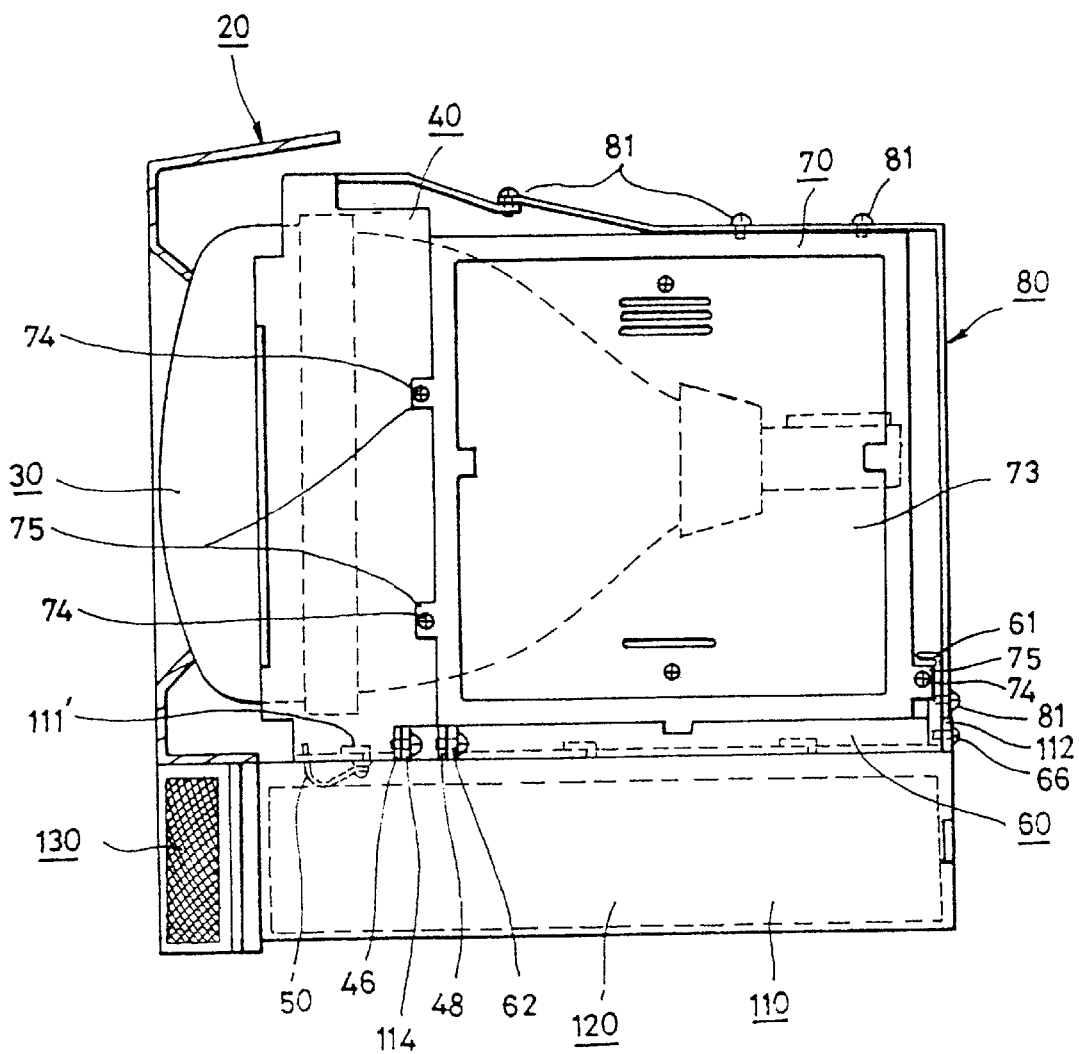
FIG. 22 is a right side elevational view of the embodiment shown in FIG. 21, including shielding.
Figure 23:
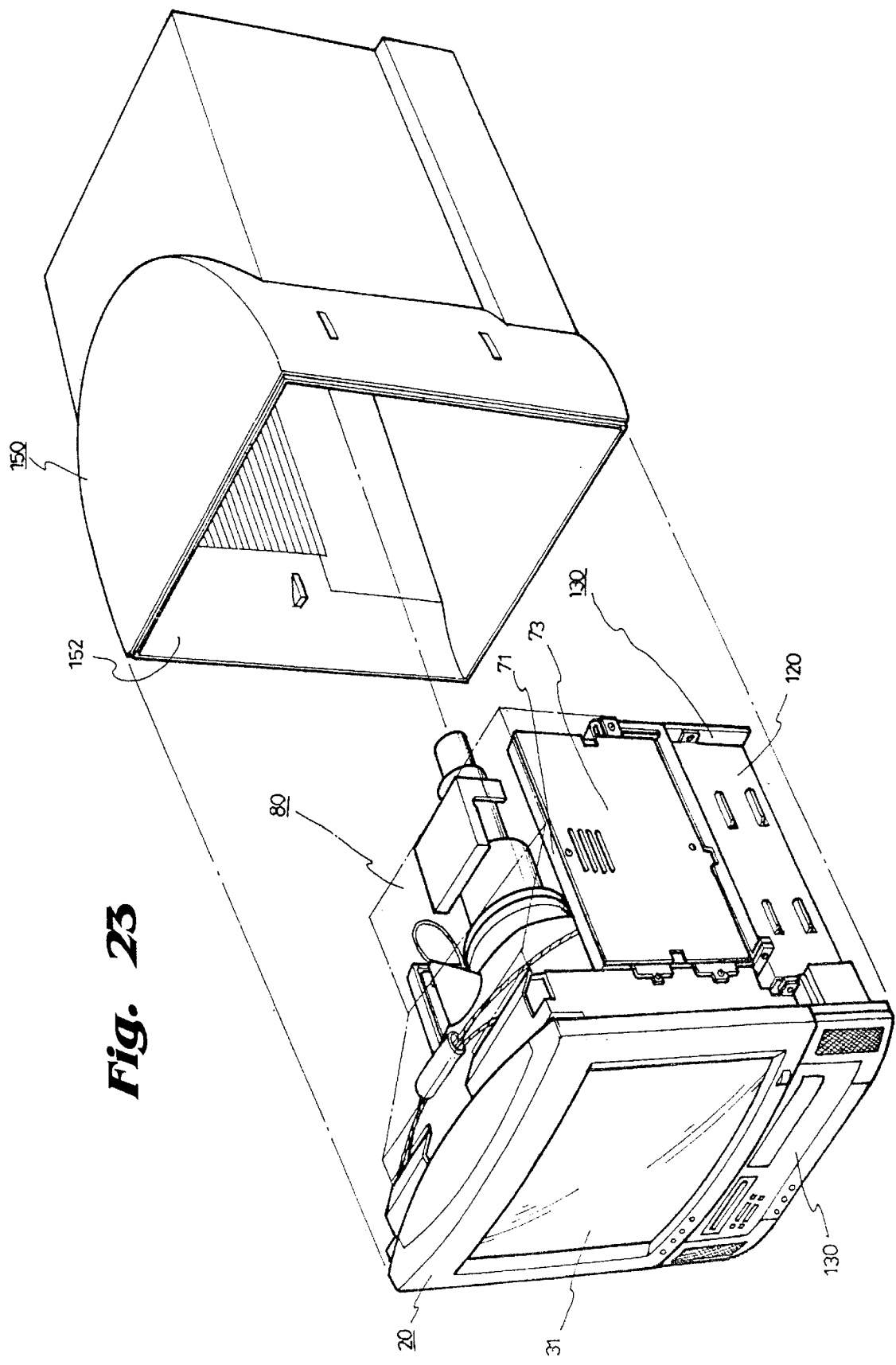
FIG. 23 is an exploded perspective view of the invention prior to having the back cover assembled.
Figure 24:
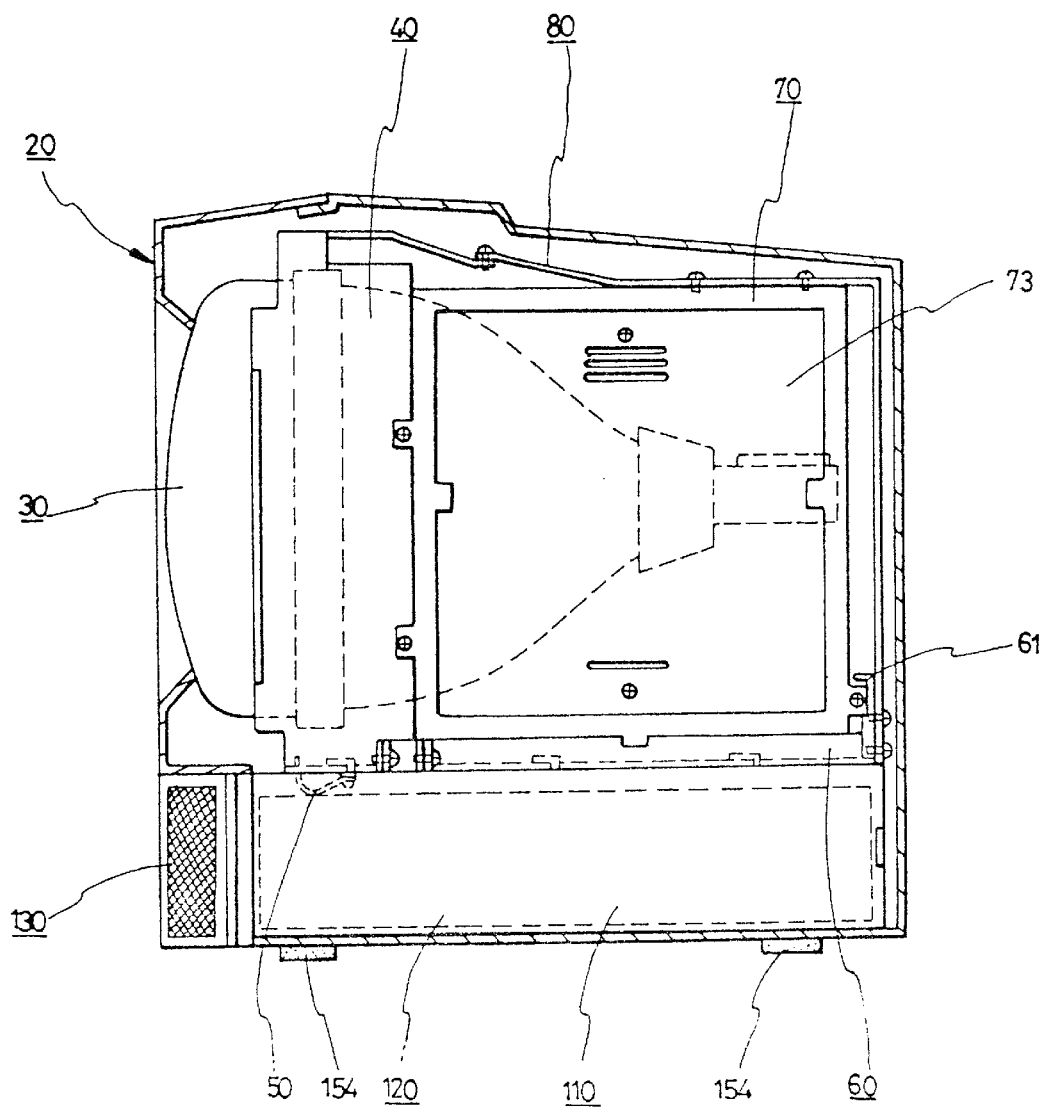
FIG. 24 is a right side elevational view, partially in cross section, of the embodiment shown in FIG. 23, as assembled.

Fifth, referring to FIGS. 22 to 24 the assembly process is concluded by inserting the drawer chassis 120 into the CPU frame 110. When the drawer chassis 120 is inserted into the CPU frame 1 10, as illustrated in FIG. 22, it contacts with the grounding plate 50 mounted on the CRT frame 40, grounding it and eliminating high voltages generated by the CRT. The back cover 150 is installed and the assembled monitor 10 and CPU 100 are inserted into the aperture 152 thereof.

The present monitor-coupled personal computer is easy to assemble and disassemble. The invention enhances productivity and offers a stable and inexpensive product. Furthermore, the present invention provides superior reliability in a machine that complies with EMI regulation.

It will be apparent to those skilled in the art that various modifications and variations may be made in the present monitor-coupled personal computer without departing from the spirit or scope of the invention. Thus, it is intended that the present invention cover the modifications and variations of this invention provided they come within the scope of the appended claims and their equivalents.

What is claimed is:

1. A method of assembling a computer system, comprising the steps of:

coupling a bottom chassis frame with an assembled central processing unit frame by pushing the bottom chassis frame rearward on the central processing unit frame to engage hooks on the central processing unit frame;

coupling a cathode ray tube frame by pushing the cathode ray tube frame rearward on the central processing unit frame to engage hooks of the central processing unit frame, and screwing the cathode ray tube frame to the bottom chassis frame;

screwing an assembly of plate frame, main circuit plate and side shield to each of the two sides of bottom chassis frame and cathode ray tube frame;

screwing a top shield to the cathode ray tube frame, the plate frames and the bottom chassis frame;

inserting a drawer chassis into the central processing unit frame; and attaching a back cover.

2. The method as recited in claim 1, further comprising the step of:

assembling the central processing unit frame by integrating a speaker, a front shield plate and a central processing unit front cover.

3. The method as recited in claim 1, said inserting of the drawer chassis further comprising the step of making contact between the drawer chassis and a grounding plate on the central processing unit frame.

4. The method of claim 1, further comprising the step of:

forming the cathode ray tube frame by coupling a front cover to a cathode ray tube.

5. A monitor-coupled personal computer comprising:

a central processing unit (CPU) frame for housing the central processing unit of the computer, the upper side of said central processing unit frame having hooks each having an inverted L-shape;

a cathode ray tube (CRT) frame for housing a cathode ray tube, the lower side of said cathode ray tube frame having coupling holes engaged with hooks of said central processing unit frame;

a bottom chassis frame oriented horizontally above said central processing unit frame, said bottom chassis frame having coupling holes engaged with hooks of said central processing unit frame, and said bottom chassis frame coupled to said cathode ray tube frame;

two plate frames, each mounted vertically and each mounted to a side of said bottom chassis frame and a side of said cathode ray tube frame;

a main circuit plate mounted to the plate frame on the inward side of the plate frame;

two side shields mounted to the plate frames on the outward sides of the plate frames for shielding from electromagnetic interference;

a top shield mounted on said cathode ray tube frame, said bottom chassis frame and said plate frames, for shielding from electromagnetic interference;

a drawer chassis for holding the central processing unit of the computer, said drawer chassis slidably mounted in said central processing unit frame;

a back cover having an aperture enclosing said top shield and central processing unit frame;

and a central processing unit front cover mounted on the front of the central processing unit frame.

6. The personal computer of claim 5, further comprising:

said coupling holes each being defined by a larger insertion area for insertion of the hook and a smaller locking area for mating with the hook.

7. The personal computer of claim 5, further comprising:

a front shield mounted between the front cover and the central processing unit frame, for shielding from electromagnetic interference.

8. The personal computer of claim 5, further comprising:

screws connecting said cathode ray tube frame with said bottom chassis frame.

9. The personal computer of claim 5, further comprising:

two screws connecting the drawer chassis to the central processing unit frame.

10. The personal computer of claim 5, further comprising:

a rear stand-up piece extending vertically from the rear of the bottom chassis frame, for connecting the bottom chassis frame to the plate frame.

11. The personal computer of claim 5, further comprising:

a tab extending vertically from the rear of the central processing unit frame; and a screw connecting said rear stand-up piece to said tab of the central processing unit frame.

12. The personal computer of claim 7, further comprising:

said inverted-L-shaped hooks of the central processing unit pointing forward for engaging the cathode ray tube frame when the cathode ray tube frame is pushed rearward.

13. The personal computer of claim 7, further comprising:

a screw coupling the plate frame to the cathode ray tube frame.

14. The personal computer of claim 7, further comprising:

drawer fixing pieces formed on both sides of the central processing unit frame; and screws coupling the drawer chassis to the drawer fixing pieces.

15. The apparatus of claim 7 further comprising:

a spring-tension grounding plate formed on the cathode ray tube frame, said grounding plate electrically contacting the drawer chassis.

16. A computer-coupled personal computer comprising:

a central processing unit frame for housing the central processing unit of the computer, an upper side of said central processing unit frame having hooks having an inverted L-shape, respectively;

a cathode ray tube frame for housing a cathode ray tube, a lower side of the cathode ray tube frame having coupling holes engaged with said hoods of said central processing unit frame;

a bottom chassis frame oriented horizontally above said central processing unit frame, said bottom chassis frame having coupling holes engaged with said hooks of said central processing unit frame, and said bottom chassis frame coupled to said cathode ray tube frame;

a drawer chassis for holding the central processing unit frame, the drawer chassis slidably mounted in said central processing unit frame; and grounding plates fixed to a bottom surface of said cathode ray tube frame, fee end of each grounding plate engaged with coupling holes of said cathode ray tube frame.

* * * * *